US007633899B2

(12) United States Patent
Choi et al.

(10) Patent No.: US 7,633,899 B2
(45) Date of Patent: Dec. 15, 2009

(54) METHOD FOR TRANSMITTING AND RECEIVING COMMON INFORMATION IN A CDMA COMMUNICATION SYSTEM PROVIDING HSDPA SERVICE

(75) Inventors: Sung-Ho Choi, Songnam-shi (KR);
Hyeon-Woo Lee, Suwon-shi (KR);
Jin-Weon Chang, Yongin-shi (KR);
Ju-Ho Lee, Suwon-shi (KR);
Kook-Heui Lee, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1549 days.

(21) Appl. No.: 10/218,311

(22) Filed: Aug. 14, 2002

(65) Prior Publication Data

US 2003/0035403 A1 Feb. 20, 2003

(30) Foreign Application Priority Data

Aug. 14, 2001 (KR) .......................... 2001-0049154

(51) Int. Cl.
*H04W 4/00* (2009.01)
(52) U.S. Cl. ........................ 370/329; 370/335; 370/342
(58) Field of Classification Search ................. 370/206, 370/208, 277, 281, 315, 319, 328, 329, 335, 370/342, 343, 437, 441, 479
See application file for complete search history.

(56) References Cited

U.S. PATENT DOCUMENTS

| 5,862,132 A * | 1/1999 | Blanchard et al. ........... 370/342 |
| 5,878,033 A | 3/1999 | Mouly |
| 6,970,438 B2 * | 11/2005 | Mate et al. .................. 370/329 |
| 7,085,248 B1 * | 8/2006 | Holma et al. ............... 370/329 |
| 2002/0094833 A1 * | 7/2002 | Lieshout et al. ............. 455/522 |
| 2002/0145988 A1 * | 10/2002 | Dahlman et al. ............ 370/335 |

FOREIGN PATENT DOCUMENTS

| EP | 001128579 A1 * | 8/2001 |
| JP | 11-252009 | 9/1999 |
| JP | 2001-53783 | 2/2001 |
| WO | WO 99/23844 | 5/1999 |
| WO | WO 00/51373 | 8/2000 |

(Continued)

OTHER PUBLICATIONS

Preliminary Search Report dated Dec. 23, 2003 issued in a counterpart application, namely, Appln. No. 0210319000.

(Continued)

*Primary Examiner*—Steven H Nguyen
*Assistant Examiner*—Phuongchau B Nguyen
(74) *Attorney, Agent, or Firm*—The Farrell Law Firm, LLP

(57) ABSTRACT

A communication system supporting an HSDPA (High-Speed Downlink Packet Access) service. In order to transmit common information to at least two UEs (User Equipments) among a plurality of UEs supporting the HSDPA service, the system transmits control information including common ID information indicating the common information over a shared control channel (SHCCH), upon generation of the common information. The system transmits the common information over the SHCCH in a TTI (Transmission Time Interval) equal to or after a TTI where the control information is transmitted, so that the UEs can support the HSDPA service using the common information.

8 Claims, 15 Drawing Sheets

FOREIGN PATENT DOCUMENTS

WO          WO 01/31968 A1 *    5/2001

OTHER PUBLICATIONS

Motorola: "Control Channel Structure for High Speed DSCH (HS-DSCH)", Oct. 10-13, 2000, TSG-RAN Working Group 1, Meeting #16.

Lucent Technologies: "Downlink and Uplink Channel Structures for HSDPA", Nov. 21-24, 2000, TSG-RAN Working Group 1.

Lucent Technologies: "Text Proposal for the HSDPA Technical Report", Nov. 21-24, 2000, TSG-RAN Working Group 1.

Universal Mobile Telecomunications System (UMTS); Physical Channels and Mapping of Transport Channels onto Physical Channels (FDD) (3G TS 25.211 version 3.1.1. Release 1999).

Swedish Patent Office Official Letter dated Apr. 2, 2003, issued in a counterpart application, namely, Appln. No. 0202417-2.

* cited by examiner

| IE/Group Name | Presence | Range | IE type and Reference | Semantios description | Criticality | Assigned Criticality |
|---|---|---|---|---|---|---|
| Configuration version number | M | | | | YES | reject |
| SHCCH Code Information | | 1 to <maxnoSHCCHcodes> | | | GLOBAL | reject |
| >DL Code Information | M | | FDD DL Code Information 9.2.2.14A | | | |
| HS-PDSCH Code information | | 1 to <maxnoHS-PDSCH> | | | GLOBAL | reject |
| >DL Code Information | M | | FDD DL Code Information 9.2.2.14A | | | |
| HS-PDSCH power information | M | | DL Power 9.2.1.21 | | YES | reject |
| SFN | O | | | | YES | ingnore |

FIG. 5

| Information Element/Group name | Need | Multi | Type and reference | Semantics description |
|---|---|---|---|---|
| Configuration version number | | | | |
| SHCCH Code Information | | 0 to <maxnoSHCCHcodes> | | |
| >DL Code Information | M | | FDD DL Code Information 9.2.2.14A | |
| HS-PDSCH Code information | | 0 to <maxnoHS-PDSCH> | | |
| >DL Code Information | M | | FDD DL Code Information 9.2.2.14A | |
| HS-PDSCH power information | O | | Integer (−10,...,50) | Power in dBm |
| SFN | O | | | |

FIG. 7

METHOD FOR TRANSMITTING AND RECEIVING COMMON INFORMATION IN A CDMA COMMUNICATION SYSTEM PROVIDING HSDPA SERVICE

PRIORITY

This application claims priority to an application entitled "Method for Transmitting and Receiving Common Information in a CDMA Communication System Providing HSDPA Service" filed in the Korean Industrial Property Office on Aug. 14, 2001 and assigned Serial No. 2001-49154, the contents of which are hereby incorporated by reference.

BACKGROUND OF THE INVENTION

1. Field of the Invention

The present invention relates generally to HSDPA communication, and in particular, to a method for transmitting common information shared by UEs (User Equipments) supporting an HSDPA service.

2. Description of the Related Art

In general, HSDPA (High-Speed Downlink Packet Access) refers to a data transmission technique for handling a high-speed downlink shared channel (HS-DSCH), i.e., a downlink data channel for supporting high-speed downlink packet data transmission, and its associated control channel in an UMTS (Universal Mobile Telecommunications System) communication system. In order to support the HSDPA, AMC (Adaptive Modulation and Coding), HARQ (Hybrid Automatic Retransmission Request), and FCS (Fast Cell Select) have been proposed.

1) AMC

AMC is a data transmission technique for adaptively determining a modulation technique and a coding technique of different data channels according to a channel condition between a Node B and a UE, thereby increasing the overall utilization efficiency of the cell. Therefore, AMC involves a plurality of modulation techniques and a plurality of coding techniques, and modulates and codes data channels by combining the modulation techniques and the coding techniques. Generally, each combination of the modulation techniques and the coding techniques is called a "MCS (Modulation and Coding Scheme)", and there are a plurality of MCSs with level #1 to level #n according to the number of combinations of the modulation techniques and the coding techniques.

In other words, AMC adaptively determines a level of the MCS according to a channel condition between the Node B and the UE that is currently wirelessly connected to the Node B, thereby increasing the overall efficiency of the Node B.

2) HARQ

HARQ, especially n-channel SAW HARQ (n-channel Stop And Wait Hybrid Automatic Retransmission Request), will be described below. HARQ has introduced the following two plans to increase transmission efficiency of ARQ (Automatic Retransmission Request). In a first plan, HARQ exchanges a data retransmission request and a response between the UE and the Node B. In a second plan, HARQ temporarily stores defective data and combines it with corresponding retransmitted data before transmission. Further, the HSDPA has introduced n-channel SAW HARQ in order to make up for the shortcomings of the conventional SAW ARQ (Stop And Wait ARQ). In the SAW ARQ, the Node B does not transmit the next packet data until an ACK (Acknowledgement) for the previously transmitted packet data is received. Therefore, in some cases, the Node B must await the ACK, though it can presently transmit packet data.

The n-channel SAW HARQ increases channel utilization efficiency by continuously transmitting a plurality of data packets before receiving the ACK for the previous packet data. If n logical channels are established between a UE and a Node B and identified by time or channel numbers, the UE, upon receipt of packet data at a certain time point, can determine the logical channel that transmitted the packet data. Thus the ULE can rearrange packet data in the right reception order or soft-combine the packet data.

3) FCS

FCS rapidly selects a cell having a good channel condition among a plurality of cells, when a UE supporting the HSDPA enters a cell-overlapped region, or a soft handover region. To be more specific, if the UE supporting the HSDPA enters a cell-overlapped region between an old Node B and a new Node B, then the UE establishes radio links to a plurality of the cells, i.e., a plurality of Node Bs. A set of the cells, to which the radio links are established by the UE, is called an "active set." FCS receives HSDPA packet data from only the cell maintaining the best channel condition among the cells included in the active set, thereby reducing the overall interference. Herein, a cell transmitting the HSDPA packet data for its best channel condition among the cells in the active set is called a "best cell." The UE periodically checks the channel conditions with the cells belonging to the active set. Upon detecting a cell having a channel condition better than that of the current best cell, the UE transmits a best cell indicator to all of the cells in the active set in order to replace the current best cell with a new best cell. The best cell indicator includes an identifier of the selected new best cell. Upon receiving the best cell indicator, the cells belonging to the active set analyze the cell identifier included in the received best cell indicator to determine whether the received best cell indicator is destined for them. The selected best cell transmits packet data to the UE using a high-speed downlink shared channel (HS-DSCH).

As described above, in the HSDPA, it is necessary to exchange the following new control signals between a UE and a Node B in order to support the newly introduced AMC, HARQ, and FCS. First, in order to support AMC, a UE must provide information on a channel between the UE and a Node B to the Node B, and the Node B must inform the UE of an MCS level determined according to the channel condition using the channel information received from the UE. Second, in order to support n-channel SAW HARQ, a UE must transmit an ACK or a NACK (Negative Acknowledgement) signal to a Node B, and the Node B must transmit n-channel SAW information to the UE. The n-channel SAW information can be a channel number and a new/continue flag, or a sequence number (SN). Third, in order to support FCS, the UE must transmit to the Node B a best cell indicator indicating a best cell, i.e., a Node B providing a channel with the best channel condition. In addition, if the best cell is changed according to the channel condition, the UE must inform the Node B of its packet data reception state at that point, and the Node B should provide necessary information so that the UE can correctly select the best cell.

The MCS level information, the HARQ information including the channel number and the new/continue flag, and the FCS information must be previously transmitted before a Node B selects a UE and transmits data to the selected UE. By previously transmitting such information before transmitting the data, the Node and the UE can perform the same operation using the information. HSDPA proposes two methods of transmitting the information to the UE; a 2-step method and a 1-step method. First, the 2-step method will be described with reference to FIG. 1.

FIG. 1 illustrates a schematic channel structure to which a 2-step method of transmitting HSDPA information is applied, in a conventional HSDPA communication system. It will be assumed in FIG. 1 that there are three UEs supporting the HSDPA service, two shared control channels (SHCCHs) assigned, and three high-speed physical downlink shared channels (HS-PDSCHs) assigned. The SHCCH, a shared channel newly designed to support the HSDPA service, transmits control information to a UE scheduled to receive the HSDPA data. For example, a high-speed shared control channel (HS-SCCH) is a typical SHCCH. The HS-PDSCH, a physical channel for transmitting the HS-DSCH, is identified by a scrambling code and an OVSF (Orthogonal Variable Spreading Factor) code. When the HSDPA service is provided, one or more HS-PDSCHs can be assigned and all UEs must recognize information on the HS-PDSCH codes.

As illustrated in FIG. 1, the HSDPA data is transmitted at a period of TTI (Transmission Time Interval), and a Node B selects a UE that will receive the HSDPA data in each TTI, and informs the corresponding UE that there exist HSDPA data to receive, over a dedicated physical channel (DPCH). To inform the corresponding UE that the HSDPA data is to be transmitted, the Node B provides the corresponding information through an HSDPA indication (HI) in each TTI of a DPCH established between the UE and the Node B. The HI is transmitted over the DPCH assigned to each UE. If a specific bit of the HI has a preset value, the UE will receive the HSDPA data in the next TTI of the HI reception point. If the specific bit of the HI does not have the preset value, the UE does not receive the HSDPA data in the next TTI of the HI reception point.

Therefore, the UE receives the HI in each TTI of the DPCH and determines whether there is HSDPA data to receive. That is, if there is data to transmit to the UE, the Node B sets a specific bit of the HI to a set value indicating that the HSDPA data exists, before transmission. The UE then receives the HI and recognizes that the HSDPA data will be received in the next TTI of the HI reception point. Actually, the HI is received in each TTI on the DPCHs assigned to the respective UEs, i.e., UE1, UE2 and UE3. However, for the sake of convenience, only the HI indicating existence of the HSDPA data is illustrated in FIG. 1.

Upon detecting the expected receipt of the HSDPA data, the UE searches SHCCH transmitted in the next TTI. If there are a plurality of the SHCCHs assigned, UE ID can be included in the SHCCH in order to identify the UE. Therefore, the UE receives information on the SHCCH transmitted with the same ULE ID as its own UE ID among the SHCCHs. Meanwhile, if the HI, as stated above, transmits only the information indicating existence of the HSDPA data to be received at the UE, the ULE ID for identifying the UE must be inserted in the SHCCH before being transmitted. However, if the HI includes information indicating existence of the HSDPA data to be received at the UE and information on the SHCCH that the UE must receive, the UE ID for identifying the UEs may not be included in the SCCH. Following receipt of the SHCCH information, the UE receives the HSDPA data in the corresponding TTI. Here, the information on the SHCCH includes UE ID, MCS level, and HARQ information, and it is assumed in FIG. 1 that the SHCCH information and the HSDPA data are transmitted in the same TTI. However, in order to minimize the number of reception buffers, it is preferable to transmit the SHCCH information ahead of HS-PDSCH. In this case, the UE can simultaneously receive the HI and the SHCCH.

FIG. 2 illustrates a schematic channel structure to which a 1-step method of transmitting HSDPA information is applied, in a conventional HSDPA communication system. It will also be assumed in FIG. 2 that there are three UEs supporting the HSDPA service, two SHCCHs assigned, and three HS-PD-SCHs assigned.

As illustrated in FIG. 2, the HI information is not transmitted over the DPCHs received by the UEs in the 1-step method. Therefore, all UEs should continuously receive the SHCCH signal, and the SHCCH should include UE ID in order to designate a target UE to which the corresponding HSDPA information should be transmitted. The UE receives the SHCCH signal, and analyzes the SHCCH signal if the received SHCCH signal includes its own UE ID. Based on the analyzed results, the UE receives data on a corresponding HS-PDSCH.

A description will now be made of Information Group #1 including the information that must be transmitted from the Node B to the UE in order to support the HSDPA service.

Information Group #1

1) HI: this indicates whether there is HSDPA data that the UE should receive.

2) MCS level information: this indicates an AMC scheme to be used in modulating the HS-DSCH.

3) HS-DSCH channelization code information: this indicates information related to a channelization code used for a specific UE in the HS-DSCH.

4) HARQ processor number: this indicates a channel transmitting specific packet data among logical channels for the HARQ, when n-channel SAW HARQ is used. The reason for providing the HARQ processor number information is as follows. When n-channel SAW HARQ is used, as many HARQ processors as the number 'n' of the channels must be provided. Therefore, when corresponding packet data is transmitted over a certain channel and the transmitted packet data has an error, it is necessary to recognize the HARQ processor number corresponding to a transmission channel of the errored packet data. That is, among the packet data transmitted from the HARQ processor corresponding to the channel number over the corresponding channel, the defective packet data is subject to a retransmission process.

5) HARQ packet data number: this is used to inform the UE of a downlink packet data number so that when a best cell is changed in the FCS, the UE can inform a newly selected best cell of a transmission state of the HSDPA data. As the packet data has its own sequence number, it can be identified by the sequence number.

6) UE ID (Identification): when it is transmitted through a part of the above information and there is at least one SHCCH, the UE ID indicates whether the SHCCH is control information for the corresponding UE.

In addition to Information Group #1, the information that must be transmitted to support the HSDPA service may include an uplink transmission power offset value. When the UE provides information of the selected best cell to neighboring Node Bs, i.e., Node Bs in the active set other than the current best cell, the UE must increase uplink transmission power by an offset so that the neighboring Node Bs can correctly receive the best cell information transmitted by the UE. In this case, the uplink transmission power offset value is provided from the Node B to the UE. In addition, the information transmitted to support the HSDPA service may include information indicating retransmission and information indicating order of the retransmission, in an HARQ operation.

The above information, uniquely given to each UE, must be transmitted to the UE ahead of an HS-DSCH signal. Therefore, there is a demand for a method of transmitting the above information ahead of the HS-DSCH signal, i.e., actual packet data. Further, the current asynchronous mobile communication system does not support a method of broadcasting information shared by all UEs in service such as the information used in the HSDPA. Thus, it is necessary to apply the HSDPA information generated by the Node B or an RNC (Radio Network Controller) to all the UEs, when the HSDPA is used.

SUMMARY OF THE INVENTION

It is, therefore, an object of the present invention to provide a method for transmitting information shared by all UEs supporting the same HSDPA service in an HSDPA communication system.

It is another object of the present invention to provide a method for transmitting information shared by all UEs supporting the same HSDPA service so that the UEs can receive the information at the same time, in an HSDPA communication system.

To achieve the above and other objects, there is provided a method for transmitting common information to at least two UEs among a plurality of UEs supporting an HSDPA service in a CDMA communication system supporting the HSDPA service. The method comprises the steps of, upon generation of the common information, transmitting control information including common ID information indicating the common information over a shared control channel (SHCCH); and transmitting the common information over the SHCCH in a TTI (Transmission Time Interval) equal to or after a TTI where the control information is transmitted. That is, the UE can receive HSDPA data in a TTI equal to or after a TTI where HI received. The UE will receive the HSDPA data in the next TTI of the HI reception point.

To achieve the above and other objects, there is provided a method of receiving common information applied in common to at least two UEs among a plurality of UEs supporting an HSDPA service in a CDMA communication system supporting the HSDPA service. The method comprises the steps of: receiving a dedicated channel in each TTI, and receiving a SHCCH signal in a TTI after a TTI where the dedicated channel signal is received, if the received dedicated channel signal includes an indicator indicating expected transmission of control information with common ID information indicating the common information; receiving a shared data channel signal in a TTI equal to or after a TTI where the SHCCH signal is received, if the received SHCCH signal includes the control information; and detecting the common information from the received SHCCH signal and performing the HSDPA service.

BRIEF DESCRIPTION OF THE DRAWINGS

The above and other objects, features and advantages of the present invention will become more apparent from the following detailed description when taken in conjunction with the accompanying drawings in which:

FIG. 5 illustrates a structure of the HSDPA Reconfiguration Request message of FIG. 4;

FIG. 7 illustrates a format of the HSDPA Reconfiguration message illustrated in FIG. 6;

DETAILED DESCRIPTION OF THE PREFERRED EMBODIMENT

Figure 1:
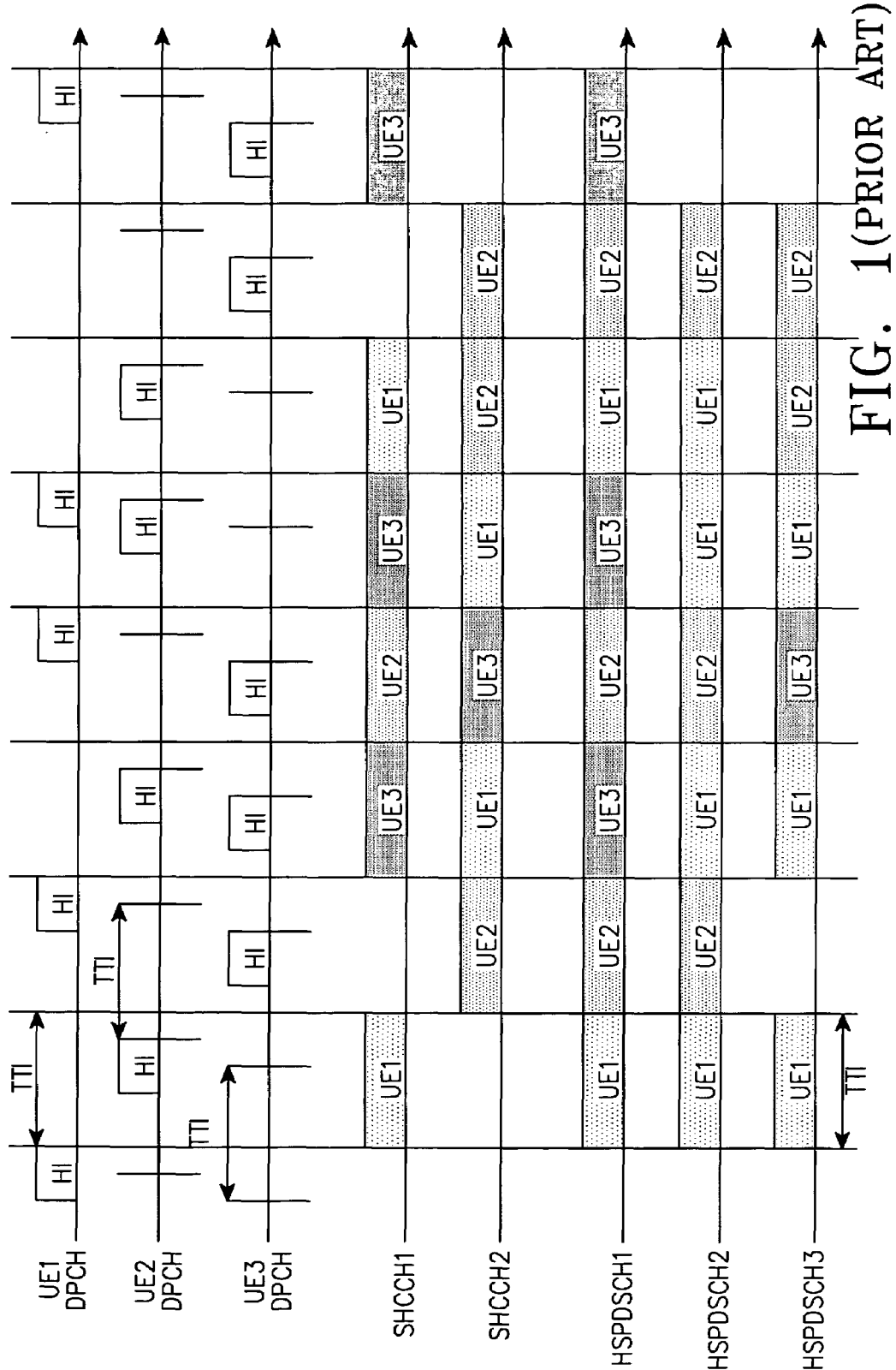
FIG. 1 illustrates a schematic channel structure to which a 2-step method of transmitting HSDPA information is applied, in a conventional HSDPA communication system.
Figure 2:
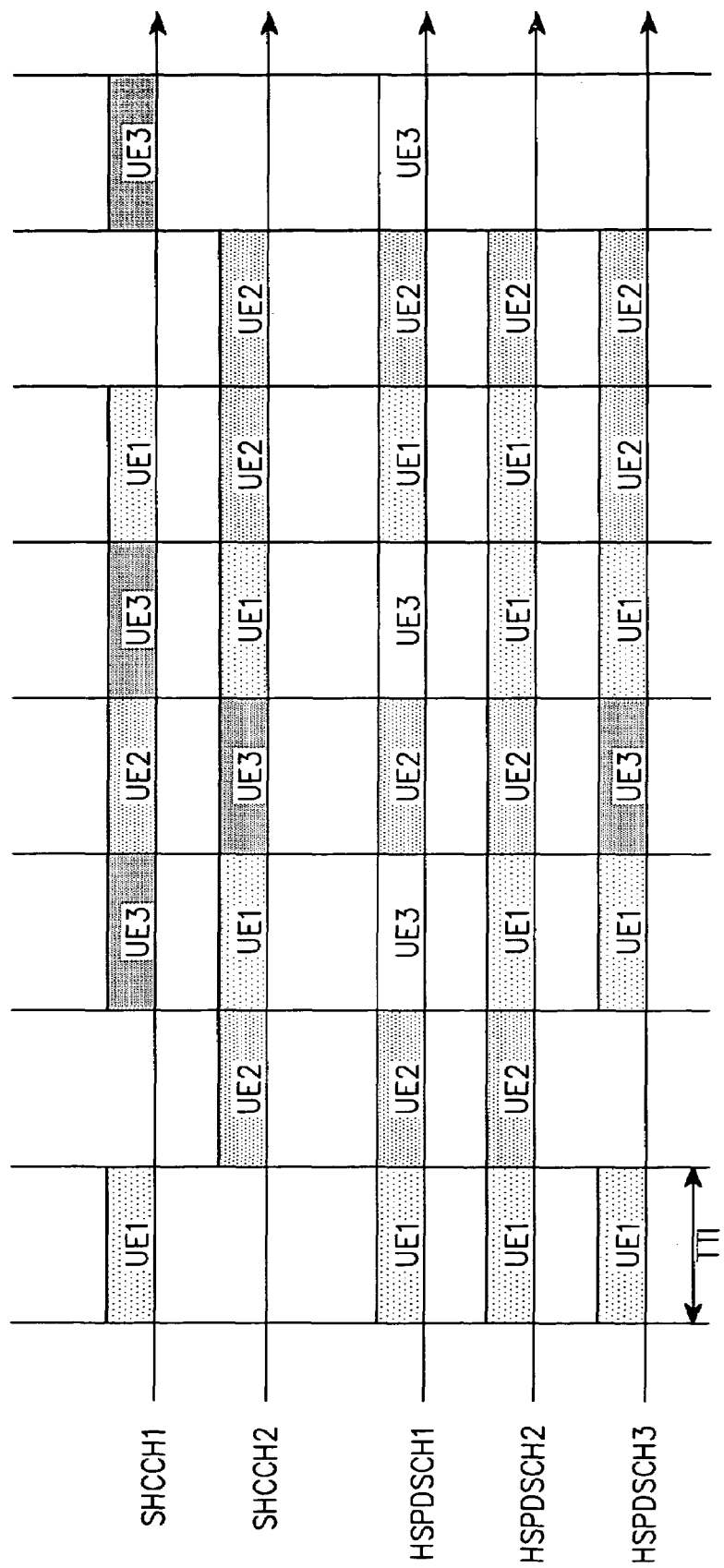
FIG. 2 illustrates a schematic channel structure to which a 1-step method of transmitting HSDPA information is applied, in a conventional HSDPA communication system.

A preferred embodiment of the present invention will be described herein below with reference to the accompanying drawings. In the following description, well-known functions or constructions are not described in detail since they would obscure the invention in unnecessary detail.

Before a description of the present invention, reference will be made to Information Group #2. An HSDPA (High-Speed Downlink Packet Access) communication system according to an embodiment of the present invention has Information Group #2 that must be transmitted from an RNC (Radio Network Controller) to a UE, in addition to Information Group #1 that must be transmitted from a Node B to a UE.

Information Group #2

1) HS-PDSCH (High-Speed Physical Downlink Shared Channel) code information: this is downlink code information assigned to a cell for transmitting HSDSCH (High-Speed Downlink Shared Channel). The HS-PDSCH, a physical channel transmitting the HS-DSCH, is identified using a scrambling code and an OVSF (Orthogonal Variable Spreading Factor) code. In the HSDPA service, one or more HSPD-SCHs can be assigned and all UEs must recognize information on the HS-PDSCH codes.

2) SHCCH (Shared Control Channel) code information: in the HSDPA service, one or more SHCCH can be assigned, and all UEs must recognize information on the SHCCH codes. Like the HS-PDSCH code information, the SHCCH code information is also identified by a scrambling code and an OVSF code.

3) HS-PDSCH code power level information: the HS-PDSCH code power level information can be defined as either a relative power value or an absolute power value for a CPICH (Common Pilot Channel) code power level. All UEs must previously recognize the HS-PDSCH code power level, a value used to demodulate HS-DSCH, before receiving actual packet data. The information transmitted from the RNC to the UE in order to the HSDPA may include HARQ-related information and MCS-related information that should also be previously recognized by all the UEs, in addition to Information Group #2. Information Group #1 and Information Group #2 necessary to perform the HSDPA service will be called "HSDPA information."

The information belonging to Information Group #2 is determined by the RNC, and transmitted to the Node B. the Node B provides the HSDPA service based on the information received from the RNC, i.e., the HSDPA information. The Node B transmits the received information to all UEs supporting the HSDPA service so that all the UEs can support the HSDPA service based on the HSDPA information. Information Group #2 can be changed by the RNC in consideration of a cell condition. The information changed in consideration of the cell condition must be transmitted to the Node B and all the UEs supporting the HSDPA service. Further, the changed information should be applied in the Node B and all the ULEs at the same time point. In addition, if the information belonging to Information Group #2, according to an embodiment of the present invention, is changed according to circumstances, the information belonging to Information Group #1 may also be changed. Herein, when the same HSDPA information is transmitted to all UEs supporting the HSDPA service or several UEs supporting the HSDPA service, the same information will be referred to as "common information." Here, the "several UEs" refer to UEs determined by grouping the UEs supporting the HSDPA service according to the type of the HSDPA service.

Figure 3:
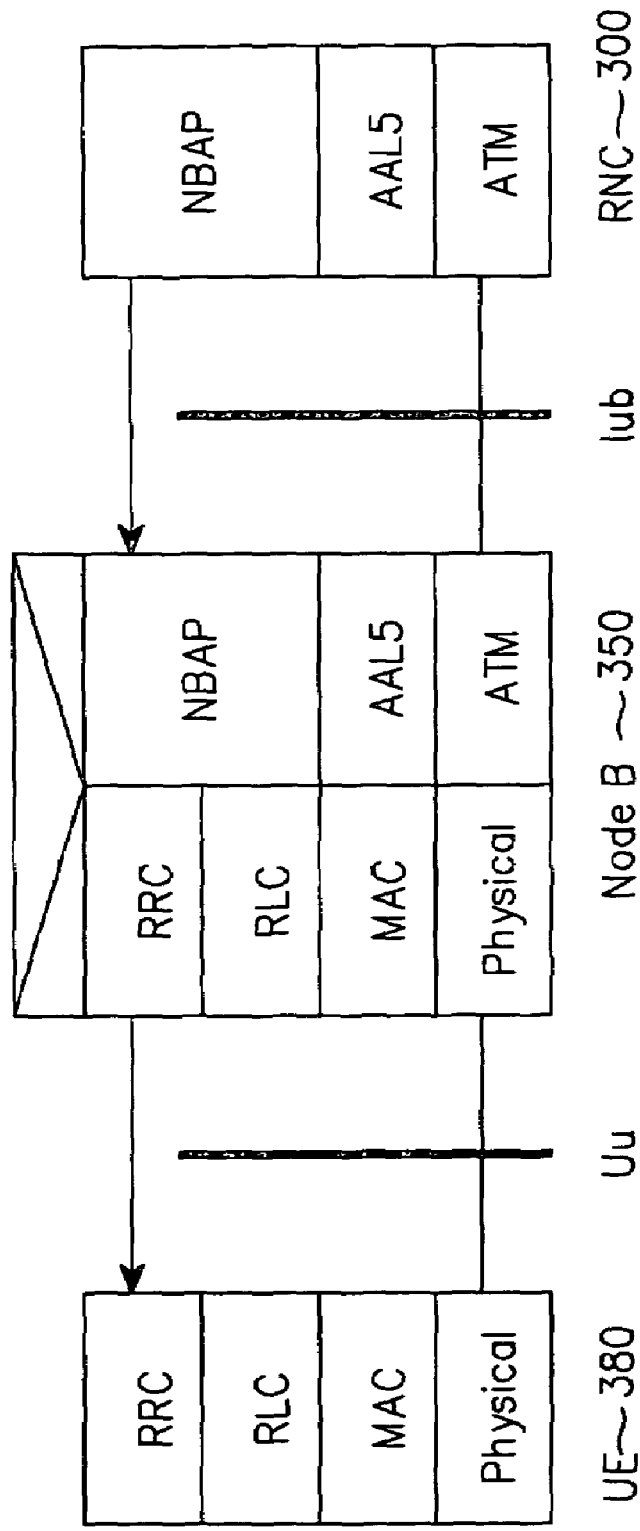
FIG. 3 illustrates a schematic structure of an HSDPA communication system to which an embodiment of the present invention is applied.

FIG. 3 illustrates a schematic structure of an HSDPA communication system to which an embodiment of the present invention is applied. In a layer structure of FIG. 3, if an RNC 300 generates common information and transmits the generated common information to a Node B 350, the Node B 350 transmits the common information to a UE 380. First, the RNC 300 transmits the common information to the Node B 350 using an NBAP (Node B Application Protocol) message. Although the RNC 300 uses AAL5 (ATM Adaptive Layer 5)/ATM (Asynchronous Transfer Mode) as a lower layer transmitting the NBAP message in FIG. 3, the lower layer transmitting the NBAP message can be freely modified with the future expected development of the communication technology. For example, the NBAP message can be transmitted using Internet protocol (IP).

Upon receiving the common information over the NBAP message from the RNC 300, the Node B 350 reconfigures the current HSDPA service according to the received common information, and retransmits information on the reconfigured HSDPA service, i.e., the common information to the UE 380 using an RRC (Radio Resource Controller) message. Preferably, the Node B 350 may transmit the RRC message with the common information several times to increase reliability. The Node B 350 generates the RRC message, and transmits the generated RRC message to the UE 380 through an RLC (Radio Link Control) layer and a MAC (Medium Access Control) layer. Upon receiving the RRC message with the common information from the Node B 350 over the air, the UE 380 continuously performs the HSDPA service using the common information.

Figure 4:
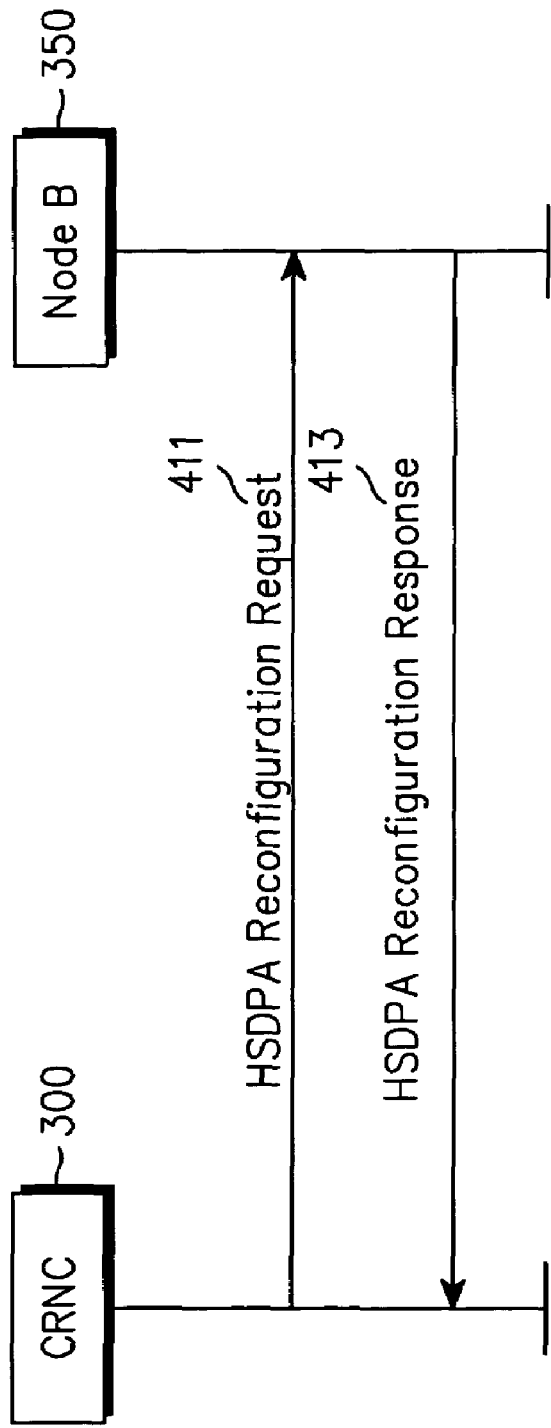
FIG. 4 illustrates a process of transmitting common information from an RNC to a Node B according to an embodiment of the present invention.

FIG. 4 illustrates a process of transmitting common information from an RNC to a Node B according to an embodiment of the present invention. Referring to FIG. 4, the RNC 300, a controlling RNC (CRNC) for controlling the Node B 350, defines a new NBAP message transmission process in order to transmit the common information. That is, the CRNC 300 defines an NBAP message for transmitting the common information to the Node B 350. In the embodiment of the present invention, an HSDPA Reconfiguration Request message is defined as the NBAP message for transmitting the common information. If the CRNC 300 transmits the HSDPA Reconfiguration Request message to the Node B 350 (step 411), the Node B 350 receives the HSDPA Reconfiguration Request message and transmits an HSDPA Reconfiguration Response message to the CRNC 300 in response to the received message (step 413).

A structure of the HSDPA Reconfiguration Request message for transmitting the common information will now be described with reference to FIG. 5. FIG. 5 illustrates a structure of the HSDPA Reconfiguration Request message illustrated in FIG. 4. Referring to FIG. 5, a format of the HSDPA Reconfiguration Request message is defined by 3GPP TS 25.433. However, as long as it can transmit the common information, any message format prescribed between the Node B and the RNC can be used. In FIG. 5, a first column indicates a name of the transmission information (IE/Group Name), a second column indicates presence of the transmission information, a third column indicates the number of repetitions on the information wherein maxnoSHCCHcodes means maximum number of assignable orthogonal codes in SHCCH and maxnoHS-PDSCHcodes means maximum number of assignable orthogonal codes in HS-PDSCH, a fourth column indicates a range of the detailed information values or a section in the TS 25.433 where reference is made to the information, a fifth column indicates a semantics description for the common information to be transmitted, a sixth column indicates criticality of the information, and a seventh column indicates the type of the critically.

First, "Configuration version number" in FIG. 5 indicates a version of the common information, and the version number is transmitted to the UE along with the common information. Upon receiving the Configuration version number, the UE analyzes the Configuration version number and compares the received version number with a version number currently stored therein for the HSDPA service. As a result of the comparison, if the received version number is different from the stored version number, it means that the next HSDPA service information is different from current HSDPA service information. Therefore, the UE configures new HSDPA service information.

Second, "SHCCH Code Information" in FIG. 5 is information on the SHCCH code. Detailed values of the SHCCH Code Information can be expressed with DL Code Information, and the DL Code Information can be defined as many ways as the number of necessary SHCCHs. Here, the DL Code Information can have the same range value as FDD DL Code Information specified by TS 25.433. Further, the DL Code Information includes scrambling code information and channelization code information of the above-defined SHCCH Code.

Third, "HS-PDSCH Code Information" in FIG. 5 is information on the HSPDSCH code. Detailed values of the HS-PDSCH Code Information can be expressed with DL Code Information, and the DL Code Information can be defined as many ways as the number of the set HS-PDSCH codes. Fourth, "HS-PDSCH power information" in FIG. 5 indicates a total power value assigned to the HS-PDSCH, and the power value can have the same range value as DL Power specified by TS 25.433.

Finally, "SFN (System Frame Number)" in FIG. 5 indicates a time point where a Node B applies the common information. The SFN can be set by either the RNC i.e., SRNC or the Node B itself. Further, in the HSDPA Reconfiguration Request message of FIG. 5, when a value in the second column is set to M (Mandatory), the corresponding information exists mandatorily. Otherwise, if the value in the second column is set to O (Optional), the corresponding information may optionally exist or not exist.

Therefore, the SFN can exist or not exist, because its second column has a value 0. First, in the case where the SFN exists, the RNC requires the Node B to apply the common information at the corresponding SFN. Upon receiving the SFN from the RNC, the Node B should perform the HSDPA service by applying the common information at a point in time indicated by the SFN. The Node B then transmits the same SFN value as the received SFN value to UEs so that the Node B and the UEs can simultaneously perform the HSDPA service by applying the common information. Next, when the SFN does not exist, the RNC does not transmit a specific SFN. In this case, the Node B performs the HSDPA service by applying the common information at a point in time indicated by an SFN selected by the Node B itself, and transmits to the UEs the selected SFN indicating the point in time where the common information is applied, so that the UEs can perform the HSDPA service by applying the common information.

The HSDPA Reconfiguration Request message format described in conjunction with FIG. 5 is a type of an NBAP message format defined on assumption that the common information is transmitted from a CRNC to a Node B so that the Node B can perform the HSDPA service by applying the common information at a specific SFN, and the common information is transmitted from the Node B to UEs so that the UEs can perform the HSDPA service by applying the common information.

In addition to the method described in conjunction with FIGS. 4 and 5, there is another common information transmission method of transmitting only a corrected part of the common information. In this case, the respective information elements in the HSDPA Reconfiguration Request message format of FIG. 5 will indicate only the newly corrected parts. For example, in the case of the SHCCH Code Information, only SHCCH Code Information newly added or SHCCH Code Information to be deleted is transmitted.

Above, the process of transmitting the common information from the RNC to the Node B using an NBAP message has been described with reference to FIGS. 4 and 5. Next, a process of transmitting from a Node B to a UE an RRC message indicating the common information received from the RNC will be described with reference to FIGS. 6 and 7.

Figure 6:
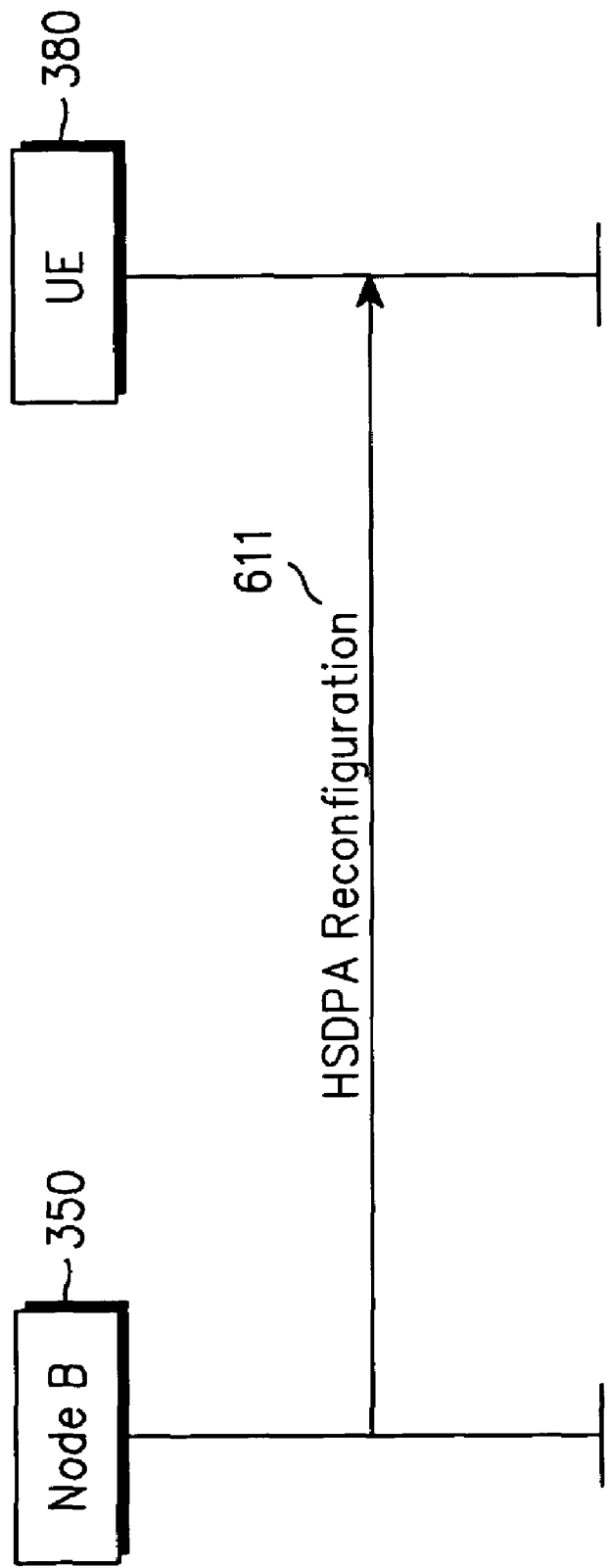
FIG. 6 illustrates a process of transmitting common information from a Node B to a UE according to an embodiment of the present invention.

FIG. 6 illustrates a process of transmitting common information from a Node B to a UE according to an embodiment of the present invention. Referring to FIG. 6, upon receiving the HSDPA Reconfiguration Request message, an NBAP message, from the RNC 300, the Node B 350 must transmit the received common information to a corresponding UE 380. As a result, the Node B 350 and the UE 380 can simultaneously perform the HSDPA service by applying the common information. For the sake of convenience, the Node B 350 transmits the common information only to the UE 380 in FIG. 6, but it should transmit the common information to all or some of the UEs supporting the HSDPA service.

In order to transmit the common information to the UE 380, the Node B 350 defines a new RRC message transmission process according to an embodiment of the present invention. That is, the Node B 350 defines an RRC message for transmitting the common information to the UE 380. In the embodiment of the present invention, the Node B 350 defines an HSDPA Reconfiguration message as an RRC message for transmitting the common information. If the Node B 350 transmits an HSDPA Reconfiguration message to the UE 380 (step 611), the UE 380 receives the HSDPA Reconfiguration message. The HSDPA Reconfiguration message, an RRC message, is segmented into packets with a specific size or comprised of a single packet. The UE 380 detects common information included in the received HSDPA Reconfiguration message, and performs the HSDPA service using the detected common information.

FIG. 7 illustrates a format of the HSDPA Reconfiguration message illustrated in FIG. 6. Referring to FIG. 7, the HSDPA Reconfiguration message format is defined by 3GPP TS 25.331. However, as long as it can transmit the common information, any message format prescribed between the Node B and the UE can be used. The HSDPA Reconfiguration message is identical in structure to the HSDPA Reconfiguration Request message of FIG. 5. However, the Node B 350 reconstructs the HSDPA Reconfiguration message using the common information included in the HSDPA Reconfiguration Request message received from the RNC 300 and transmits the reconstructed message to the UE 380. Since all the parameters of the HSDPA Reconfiguration message illustrated in FIG. 7 are identical to those of the HSDPA Reconfiguration Request message described in conjunction with FIG. 5, the detailed description will not be provided for simplicity.

Next, a process of simultaneously transmitting the common information, i.e., broadcasting the same common information from the Node B to all UEs performing the HSDPA service will be described with reference to FIGS. 8 and 9.

The process of FIGS. 8 and 9 will be described on the assumption that there are three UEs supporting the HSDPA service, two SHCCHs assigned, and three HS-PDSCHs assigned. The SHCCH, a shared channel newly designed to support the HSDPA service, transmits control information to a UE scheduled to receive the HSDPA data. The HS-PDSCH, a physical channel for transmitting the HS-DSCH, is identified by a scrambling code and an OVSF code. When the HSDPA service is provided, one or more HS-PDSCHs can be assigned and all UEs must recognize information on the HS-PDSCH codes. Of course, the invention can also be applied when there are L UEs, M SHCCHs, and N HS-PDSCHs. Further, it will be assumed in FIGS. 8 and 9 that a Node B transmits common information to UEs in $(n+2)^{th}$ TTI and $(n+5)^{th}$ TTI.

Figure 8:
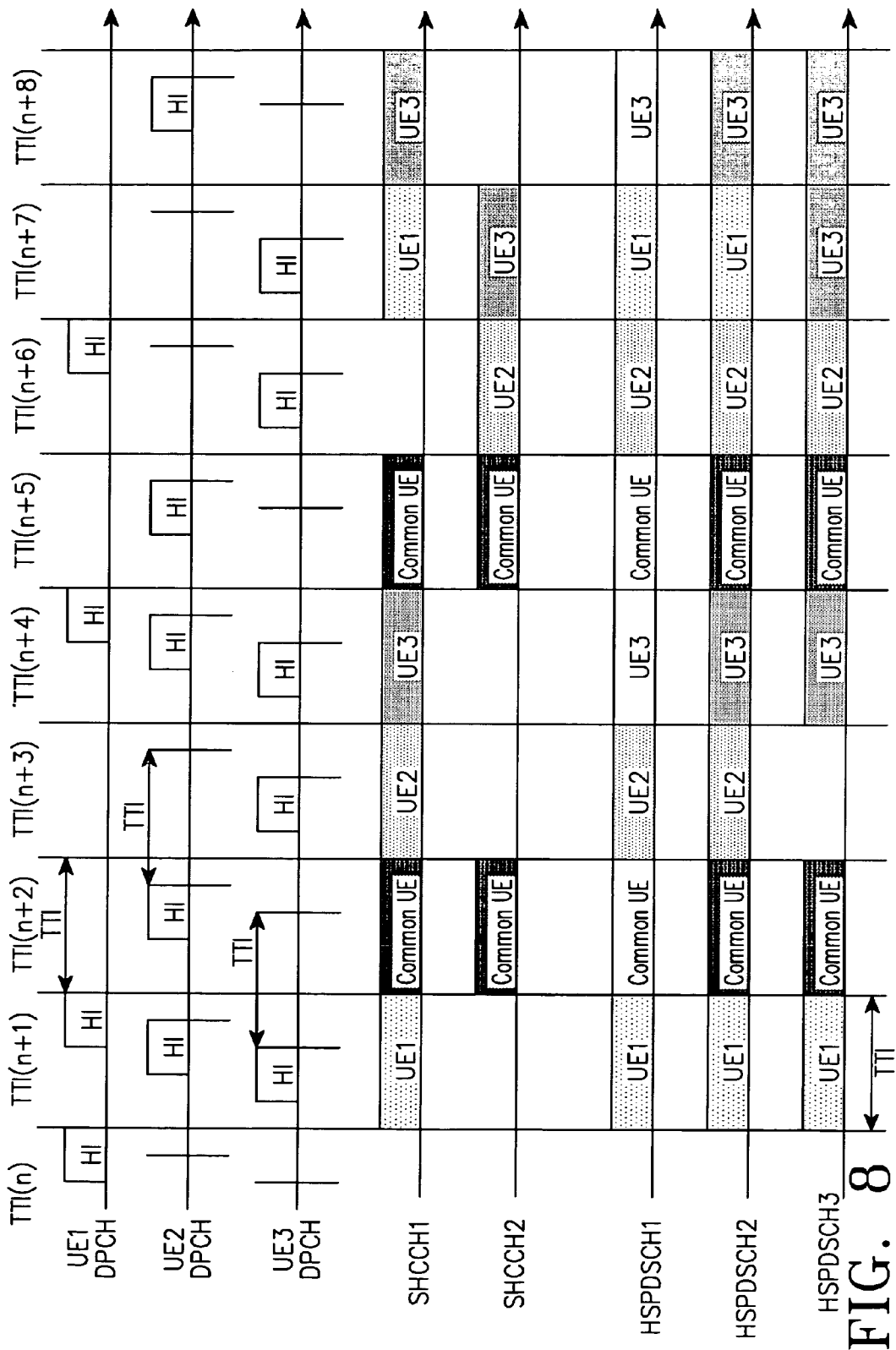
FIG. 8 illustrates a schematic channel structure to which a 2-step method of transmitting HSDPA information is applied, in an HSDPA communication system according to an embodiment of the present invention.

FIG. 8 illustrates a schematic channel structure to which a 2-step method of transmitting HSDPA information is applied, in an HSDPA communication system according to an embodiment of the present invention. Referring to FIG. 8, a Node B that has determined to transmit common information in an $(n+2)^{th}$ TTI, transmits an HSDPA indication (HI) to all UEs at corresponding slots in an $(n+1)^{th}$ TTI using DPCHs of the UEs. For the sake of convenience, only the HI in the TTI where HSDPA data actually exists is illustrated in FIG. 8. However, actually, the HI can be transmitted in each TTI, so the Node B selects a UE scheduled to receive the HSDPA data in each TTI, and informs a corresponding UE of a presence of data to be received, through the HI over the DPCH. The HI is transmitted over the DPCH assigned to each UE. If a specific bit of the HI has a preset value, the UE will receive the HSDPA data in the next TTI of the HI reception point. If the specific bit of the HI does not have the preset value, the UE does not receive the HSDPA data in the next TTI of the HI reception point.

Further, the Node B transmits corresponding information over an SHCCH in an $(n+2)^{th}$ TTI transmitting HS-PDSCH information, in the $(n+2)^{th}$ TTI. In order to inform all UEs of transmission of the common information, the Node B uses a preset Common UE ID. A specific UE ID among available UE IDs can be defined as the Common UE ID. If the Common UE ID information has a fixed value, the Node B previously transmits the Common UE ID to all the UEs to allow the UEs to previously recognize the Common UE ID. If the Common UE ID is not a fixed value, the Node B transmits the Common UE ID to corresponding UEs along with other setup information when the UEs each initiate the HSDPA service, so that the UEs can recognize the Common UE ID.

All the UEs that have recognized the expected receipt of the common information through the Common UE ID in the $(n+2)^{th}$ TTI, receive HS-PDSCH of the corresponding TTI after analyzing corresponding SHCCH information. If the HI information in the $(n+1)^{th}$ TTI indicates an SHCCH that should be read in addition to information indicating presence of the HSDPA data to the corresponding UEs, the SHCCH may not include the UE ID information. In this case, all the UEs are required to read a specific SHCCH, and the specific SHCCH may indicate information on a PDSCH for transmitting the common information. In this case, the SHCCH may include an indication (e.g., an indicator) indicating that the common information will be transmitted over the HS-PDSCH. For the indication, an MCS level or certain information included in the SHCCH, i.e., HARQ information or HS-PDSCH code information can be used. Although the SHCCH information is transmitted in a TTI of the corresponding HI or earlier, a certain UE can receive corresponding SHCCH information in the same TTI of the HI or even in an earlier TTI, using a buffer.

When the MCS level is used, if, for example, there exist 7 MCS levels, 3 information bits are needed to indicate the 7 MCS levels. In this case, since the number of cases that can be indicated by the 3 bits is 8, 7 of the 8 cases are mapped to the MCS levels and the remaining 1 case is used as the indication that the HS-PDSCH is common information.

When the MCS level is used to indicate that the HS-PDSCH is common information, the MCS level can be previously fixed, thus enabling the above method. That is, when the HS-PDSCH transmits common information, a specified one of the MCS levels is previously designated as a common information indication to indicate transmission of the common information. The MCS level to be used during transmission of the common information indication must be transmitted with high reliability so that all UEs can correctly receive the common information. Thus, it is preferable to use an MCS level available even in the worst channel condition. When the HARQ information or the HS-PDSCH code information is used, the HARQ information or the HS-PDSCH code information has a constant value during transmission of the common information. Further, if the number of bits expressing the cases is larger than the total number of cases, an operation is performed in the same manner as when the MCS level is used.

In FIG. 8, the common information transmission method has been made on the assumption that all the UEs of the Node B receive the common information for the HSDPA service. Next, with reference to FIG. 9, a description will be made of a method for transmitting the common information on the assumption that only some UEs of the Node B receive the common information for the HDSPA service.

Figure 9:
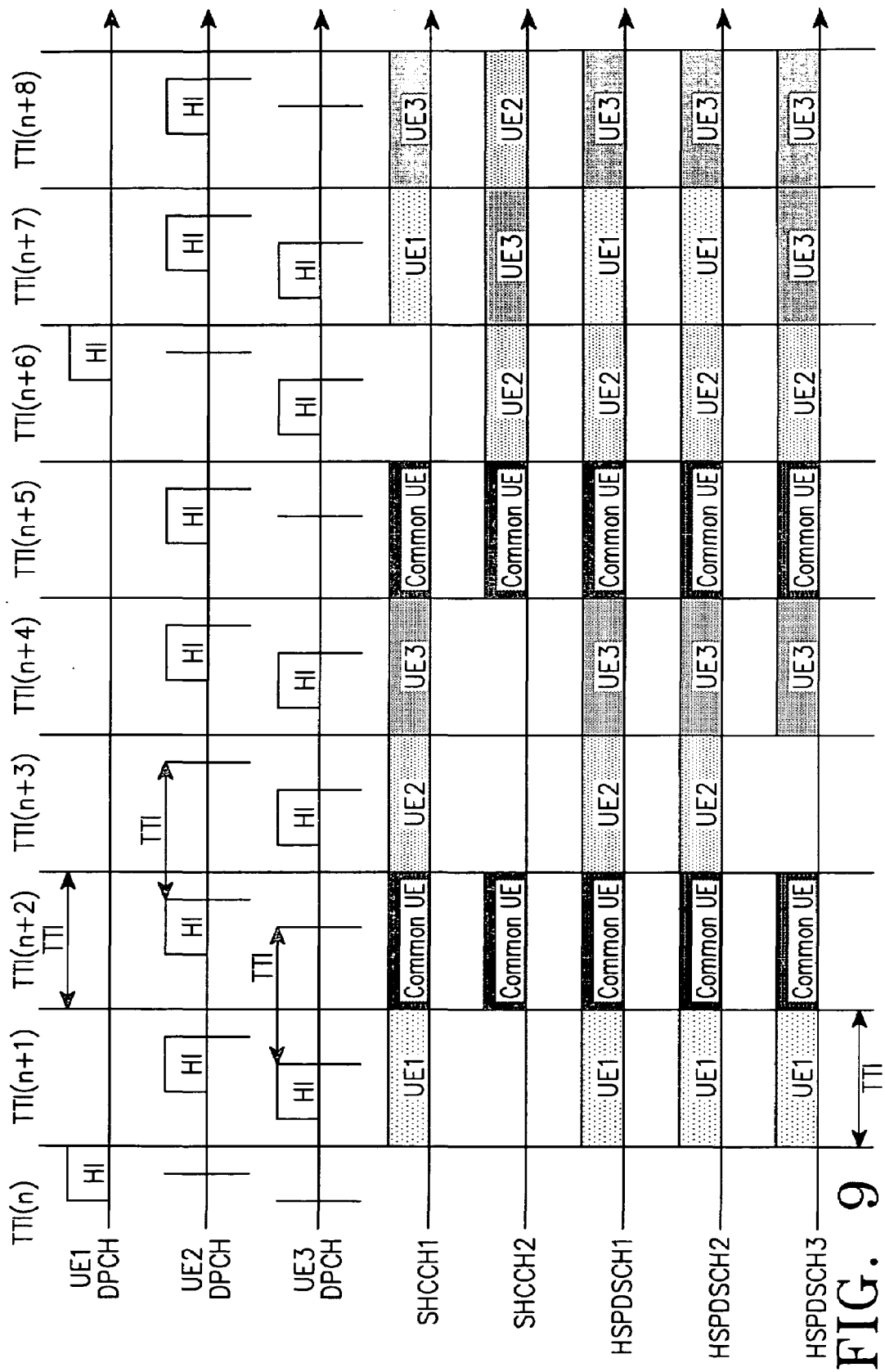
FIG. 9 illustrates a schematic channel structure to which a 2-step method of transmitting HSDPA information is applied, in an HSDPA communication system according to another embodiment of the present invention.

FIG. 9 illustrates a schematic channel structure to which a 2-step method of transmitting HSDPA information is applied in an HSDPA communication system according to another embodiment of the present invention. It will be assumed in FIG. 9 that some of UEs existing in the same Node B receive common information for the HSDPA service and the remaining UEs do not receive the common information. In FIG. 9, the UEs are separated into a group of UEs receiving the common information and another group of UEs not receiving the common information, and reference will be made to only the UEs receiving the common information. It will also be assumed in FIG. 9 that there are three UEs supporting the HSDPA service, two SHCCHs assigned, and three HS-PDSCHs assigned. In FIG. 9, the three UEs are separated into a group of UE2 and UE3 receiving the common information and another group of UE1 not receiving the common information.

The Node B that has determined to transmit common information in an $(n+2)^{th}$ TTI, transmits an HI at corresponding slots using DPCHs of the UEs scheduled to receive the common information. As described in conjunction with FIG. 8, the HI is transmitted in each TTI, and for the sake of convenience, only the HI in the TTI where HSDPA data actually exists is illustrated in FIG. 9. Further, the Node B transmits corresponding information over an SHCCH in an $(n+2)^{th}$ TTI transmitting HS-PDSCH information, in the $(n+2)^{th}$ TTI. In order to inform the corresponding UEs of transmission of the common information, the Node B uses a preset Common UE ID. Since the Common UE ID is set and transmitted in the same manner as described in FIG. 8, the detailed description will not be provided.

The UE2 and the UE3 that have recognized the expected receipt of the common information through the Common UE ID in the $(n+2)^{th}$ TTI, receive HS-PDSCH of the corresponding TTI after analyzing corresponding SHCCH information. If the HI information in the $(n+1)^{th}$ TTI indicates information indicating an SHCCH that should be read in addition to information indicating presence of the common information, the SHCCH may not include the UE ID information. In this case, the corresponding UEs are required to read a specific SHCCH, and the specific SHCCH may indicate information on an HS-PDSCH for transmitting the common information. In this case, the SHCCH may include a common information indication indicating that the common information will be transmitted over the HS-PDSCH. For the indication, an MCS level or certain information included in the SHCCH, i.e., HARQ information or HS-PDSCH code information can be used. In FIG. 9, the HI is transmitted to the UE2 and the UE3 even in an $(n+7)^{th}$ TTI, since the HSDPA data is transmitted to the UE2 and the UE3. In this case, the SHCCH transmits the UE IDs indicating the UEs instead of the Common UE ID.

It is assumed in FIGS. 8 and 9 that the HI is transmitted before the TTI where the HS-PDSCH is transmitted, and the SHCCH is transmitted in the same TTI as the HS-PDSCH. However, the embodiment of the present invention is applicable even when the HI is transmitted in the same TTI as the SHCCH and the HS-PDSCH is transmitted in the next TTI of the TTI where the HI is transmitted. Further, the embodiment of the present invention can be applied regardless of a variation in a transmission period of the HI, the SHCCH, and the HS-PDSCH. However, it is assumed that the UE receives the information in the order of the HI, the SHCCH, and the HS-PDSCH.

A UE that has received the common information as described in conjunction with FIGS. 8 and 9, does not transmit an ACK/NACK for the received HS-PDSCH. In a general HSDPA communication system, upon receiving an HS-PD- SCH, UEs perform CRC (Cyclic Redundancy Check) on the received HS-PDSCH. The UEs transmit an ACK when there is no error, and transmit a NACK when there is an error. However, when the common information is received, the UEs do not transmit the ACK or the NACK. This is because when a plurality of UEs simultaneously transmit the ACK or the NACK, interference on the air due to the ACK or the NACK increases abruptly, having a considerable influence on other communication. Therefore, the Node B should set an MCS level and transmission power such that all UEs can receive the common information without an error. Thus, it is possible to assume that all the UEs receive the common information without an error. However, an error may occur in the received common information according to a state of the UEs, so the Node B needs a method of allowing all the UEs to receive the common information without errors.

There are two methods of allowing all the UEs to receive the common information with high reliability, which will be described below.

A first method is to repeatedly transmit the common information by the Node B. When transmitting the common information a predetermined number of times (N times), the Node B should indicate that information except the initially transmitted common information, i.e., the 2 to N-time repeated common information, is repeated common information. Accordingly, if a certain UE determines that previously received common information has an error, the UE can normally receive the common information using newly received repeated common information. There are two methods of indicating that the common information is repeated common information. In a first method, when the MCS level is previously set in the SHCCH, if the conventional SHCCH transmits common information rather than MCS level information, MCS level information indicating that the common information is repeatedly transmitted common information for retransmission is transmitted over the SHCCH. In a second method, information indicating whether the common information is repeated transmission information is transmitted along with HARQ information transmitted by the conventional SHCCH, to indicate whether the common information is initially transmitted common information or repeatedly transmitted common information.

In this manner, if the UE recognizes that the common information is repeated common information, it combines the repeated common information with previously received common information. However, if the common information is initially transmitted common information and has no error, the UE transmits the common information to an upper layer.

In a second method of allowing all the UEs to receive the common information with high reliability, only the UEs that received defective common information from the Node B transmit a NACK, and then the Node B retransmits the common information to the UEs that transmitted the NACK.

That is, among the UEs that received the common information, only the UEs having an error in the received common error transmit the NACK to the Node B. Upon receipt of the NACK, the Node B repeatedly transmits the common information only to the UEs that transmitted the NACK signal. In this case, the common information is especially repeatedly transmitted only to the UEs that transmitted the NACK, and in order to increase reliability of the repeated transmission, the Node B may perform the repeated transmission a predetermined number of times. The UEs that transmitted the NACK combine the common information repeatedly transmitted by the Node B with the previously received common information.

Figure 10:
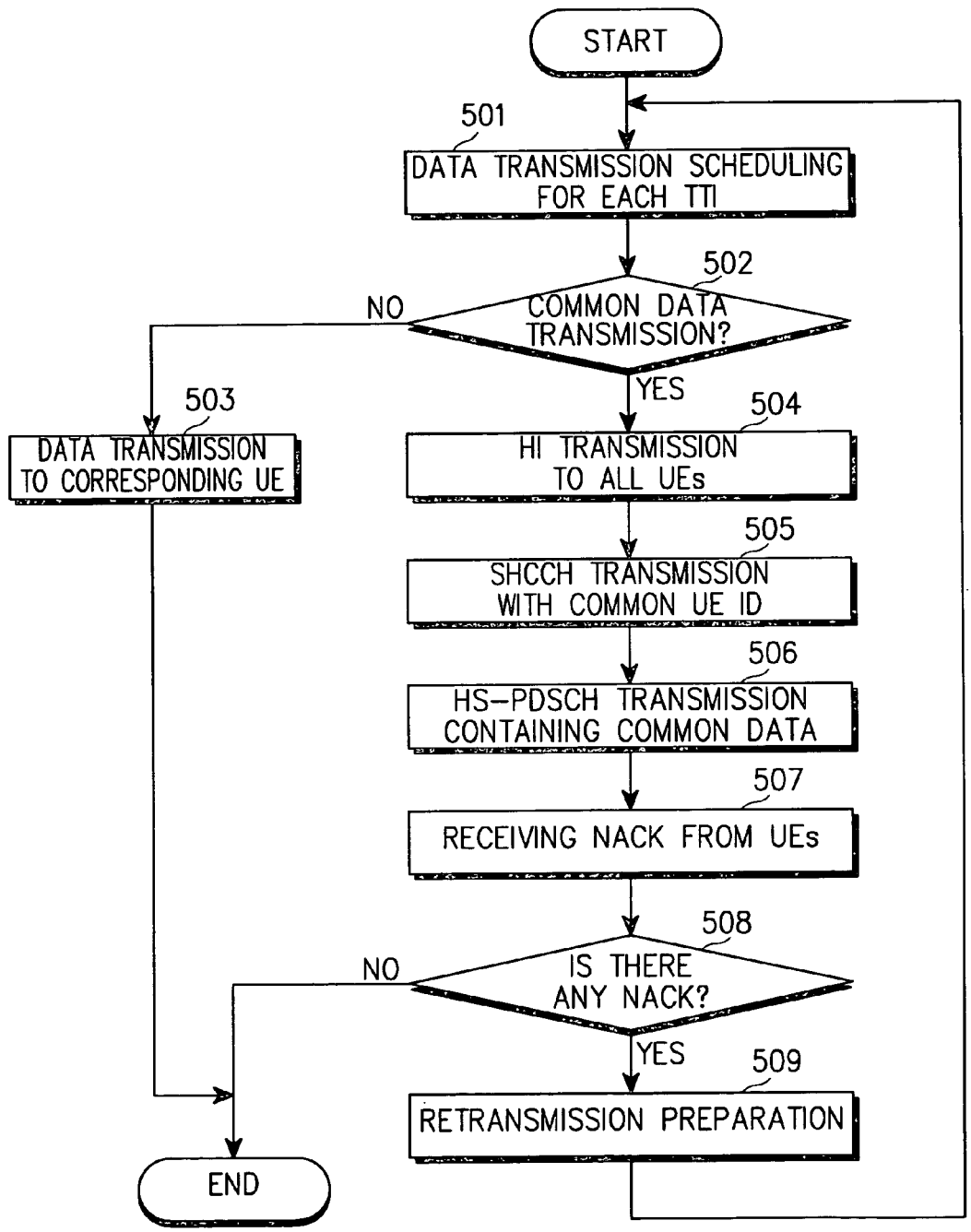
FIG. 10 illustrates a procedure for transmitting HSDPA information by a Node B using a 2-step method according to an embodiment of the present invention.

FIG. 10 illustrates a procedure for transmitting HSDPA information by a Node B using a 2-step method according to an embodiment of the present invention. Referring to FIG. 10, in step 501, the Node B performs transmission scheduling on HSDPA data for each TTI. Here, the Node B repeats transmission scheduling on the HSDPA data in each TTI, and determines transmission data and a corresponding MCS level by analyzing HSDPA data and common information data to be transmitted to each UE among the currently transmitted HSDPA data. In addition, the Node B determines a data rate considering a channel condition and data amount of each UE. When there is common information to transmit, the Node B first transmits common information related to the data rate.

In step 502, the Node B determines whether the transmission data scheduled in each TTI is common information data. If the scheduled transmission data is not common information data, the Node B proceeds to step 503, where it transmits the transmission data to a corresponding UE according to a normal HSDPA data transmission process. That is, the Node B first transmits HI to the corresponding UE, then transmits information on the corresponding UE over the SHCCH, and next transmits data to be transmitted to the corresponding UE based on the information transmitted over the SHCCH using HS-PDSCH. After transmitting the data, the Node B receives an ACK or a NACK within a preset time and ends data transmission.

However, if it is determined in step 502 that the scheduled transmission data is common information data, the Node B proceeds to step 504. In step 504, prior to transmission of the common information, the Node B sets a set value indicating that the Node B has common information to be transmitted over the HI of all UEs supporting the HSDPA service, and transmits the set value so that all the UEs can receive the common information. Of course, if, as illustrated in FIG. 9, the UEs are separated by the Node B into a group of UEs receiving the common information and another group of UEs not receiving the common information and the common information is transmitted only to the UEs receiving the common information, the Node B sets in step 504 a set value indicating that the common information exists in the HI transmitted to only the UEs receiving the common information. Of course, the HI is transmitted over the DPCH assigned to each UE in each TTI. As illustrated in FIGS. 8 and 9, the HI can be used to command each UE to receive an SHCCH and can include information indicating the SHCCH that should be received. When the HI includes information indicating the SHCCH that should be received, a preset SHCCH is set so that all UEs can receive the same SHCCH.

In step 505, the Node B transmits information or common information on an HS-PDSCH that should be received by all UEs, over SHCCH of the next TTI of a TTI where the HI with a set value indicating presence of the common information is transmitted. If the HI does not include information indicating SHCCH that should be received, the SHCCH should transmit UE ID. When transmitting common information, the SHCCH transmits Common UE ID known to all UEs so that the UEs can receive the common information. The Common UE ID is a selected one of the UE IDs, and for this, a fixed value can be used or the same value can be transmitted when each UE initiates the HSDPA service. Therefore, it is assumed in the present invention that all the UEs can recognize the Common UE ID. The SHCCH may include MCS-related information, HS-PDSCH code information and HARQ-related information in addition to the Common UE ID. In particular, if the Node B transmits common information of the HARQ information at least once and then retransmits the common information in response to NACK transmitted from the UEs, the Node B can insert information on the retransmission or repeated transmission in the HARQ information. That is, the Node B transmits information indicating whether the currently transmitted common information is retransmitted common information or initially transmitted common information. Since common information of the MCS level information should be transmitted with high reliability so that all UEs can receive the common information, the MCS level is determined based on the UE having the worst channel condition. In addition, with the HS-PDSCH code information, the number of codes can be adjusted according to an amount of common information. Therefore, when an amount of the common information is small and the number of codes is large enough, the Node B can repeatedly transmit the common information using several codes, or increase transmission power using the reduced number of codes. Both the repeated transmission and the increase in transmission power contribute to reliable transmission of the common information.

In step 506, the Node B transmits the common information using HS-PDSCH in the same TTI as the SHCCH is transmitted according to an MCS level set based on the SHCCH information, and the HS-PDSCH code information. In step 507, the Node B waits for a NACK signal to be received from each UE. It is assumed in FIG. 10 that the UEs transmit the NACK only when received common information has an error. Meanwhile, if it is assumed that the UEs do not transmit the NACK, an operation of steps 507 and 508 can be omitted.

In step 508, the Node B determines whether a NACK signal is received from the UEs. If the NACK signal is not received, the Node B recognizes that transmission of the common information is successfully ended, and ends the procedure. However, if the NACK signal is received in step 508, the Node B proceeds to step 509. In step 509, the Node B determines to repeatedly transmit the common information to the UEs that transmitted the NACK signal, prepares to retransmit the common information, and returns to step 501. Upon receipt of the NACK, the Node B may transmit the common information to either all UEs or only the UEs that transmitted the NACK. In the latter case, the Node B sets in step 504 the set value indicating transmission of the common information only in the HI of the UEs that transmitted the NACK.

The operating process by the Node B has been described with reference to FIG. 10. Next, an operating process by the UE will be described with reference to FIG. 11.

Figure 11:
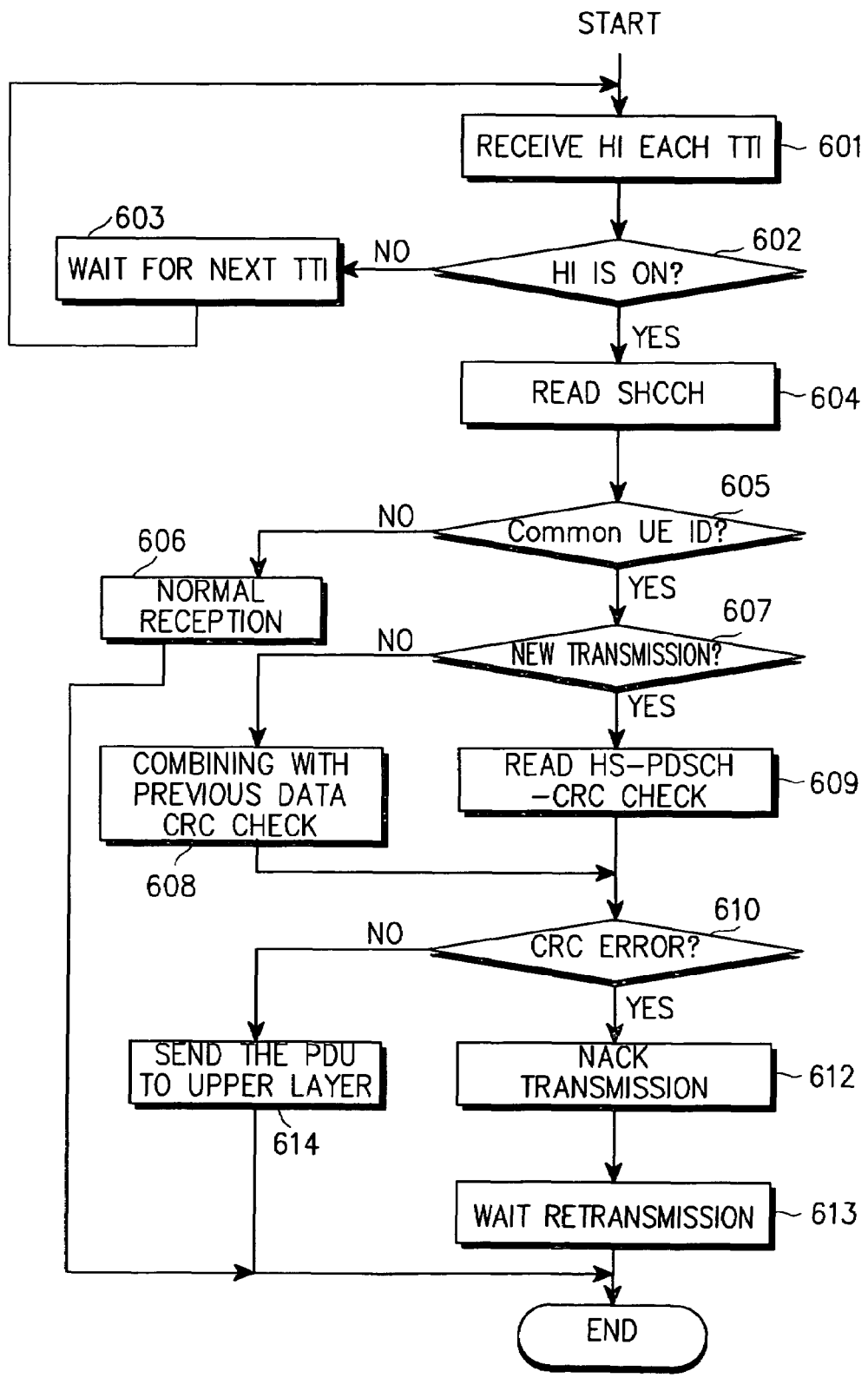
FIG. 11 illustrates a procedure for receiving HSDPA information by a UE using a 2-step method according to an embodiment of the present invention.

FIG. 11 illustrates a procedure for receiving HSDPA information by a UE using a 2-step method according to an embodiment of the present invention. Referring to FIG. 11, the UE receives HI in each TTI in step 601. The UE determines in step 602 whether the received HI has an indication indicating existence of data to be received (HI on). If the HI has an indication indicating existence of data to be received, the UE proceeds to step 604. Otherwise, if there is no data to receive, i.e., if the HI does not have an indication indicating existence of data to be received (HI off), the UE proceeds to step 603, where it waits for HI of the next TTI to be received.

In step 604, the UE receives SHCCH in the next TTI after receiving the HI. If the HI received in step 603 includes information on SHCCH to be received, the UE receives the corresponding SHCCH in step 604. However, if the HI received in step 603 does not include information on SHCCH to be received, the UE reads all SHCCHs to analyze UE ID and receives a corresponding SHCCH according to the analysis, in step 604. In step 605, the UE determines whether UE ID in the received SHCCH is a Common UE ID. If UE ID in the received SHCCH is not a Common UE ID, the UE proceeds to step 606, where it performs a normal HSDPA data reception operation and then ends the procedure. In the normal reception operation, the UE analyzes information on SHCCH with its own UE ID, receives HS-PDSCH according to the analyzed information, and transmits an ACK/NACK.

If the UE ID is a Common UE ID in step 605, the UE proceeds to step 607. In step 607, the UE analyzes repeated transmission-related information in the SHCCH with the Common UE ID and determines whether the common information is initially transmitted common information (New Transmission). If the common information is not initially transmitted common information, i.e., the common information is retransmitted common information, the UE proceeds to step 608. In step 608, the UE combines the retransmission common information with the previously received defective common information, performs CRC check on the combined common data, and then goes to step 610. There are several methods of combining the previously received common information with the retransmitted common information. A first combining method to perform CRC check on the retransmitted common information, combine the retransmitted common information with the previously received common information when there is an error, and then perform the CRC check again on the combined common information. A second combing method is to combine the previously received common information with the retransmitted common information in a symbol unit and then perform CRC check on the combined common information.

However, if it is determined in step 607 that the common information is initially transmitted common information, the UE performs CRC check on the received common information in step 609. The UE determines in step 610 whether there is a CRC error. If there is no CRC error, the UE transmits the received common information to an upper layer to analyze the common information in step 614. However, if there is a CRC error in step 610, the UE transmits a NACK to inform the Node B that the received common information has an error, in step 612. The operation of step 612 is needed only when the UE transmits the NACK. If the UE does not transmit the NACK even though the received common information has an error, the operation of step 612 can be omitted. In step 613, the UE waits for the common information to be retransmitted from the Node B.

Above, the method of transmitting the common information using the 2-step method has been described with reference to FIGS. 8 to 11. Next, a method of transmitting the common information using the 1-step method will be described with reference to FIGS. 12 to 15.

Figure 12:
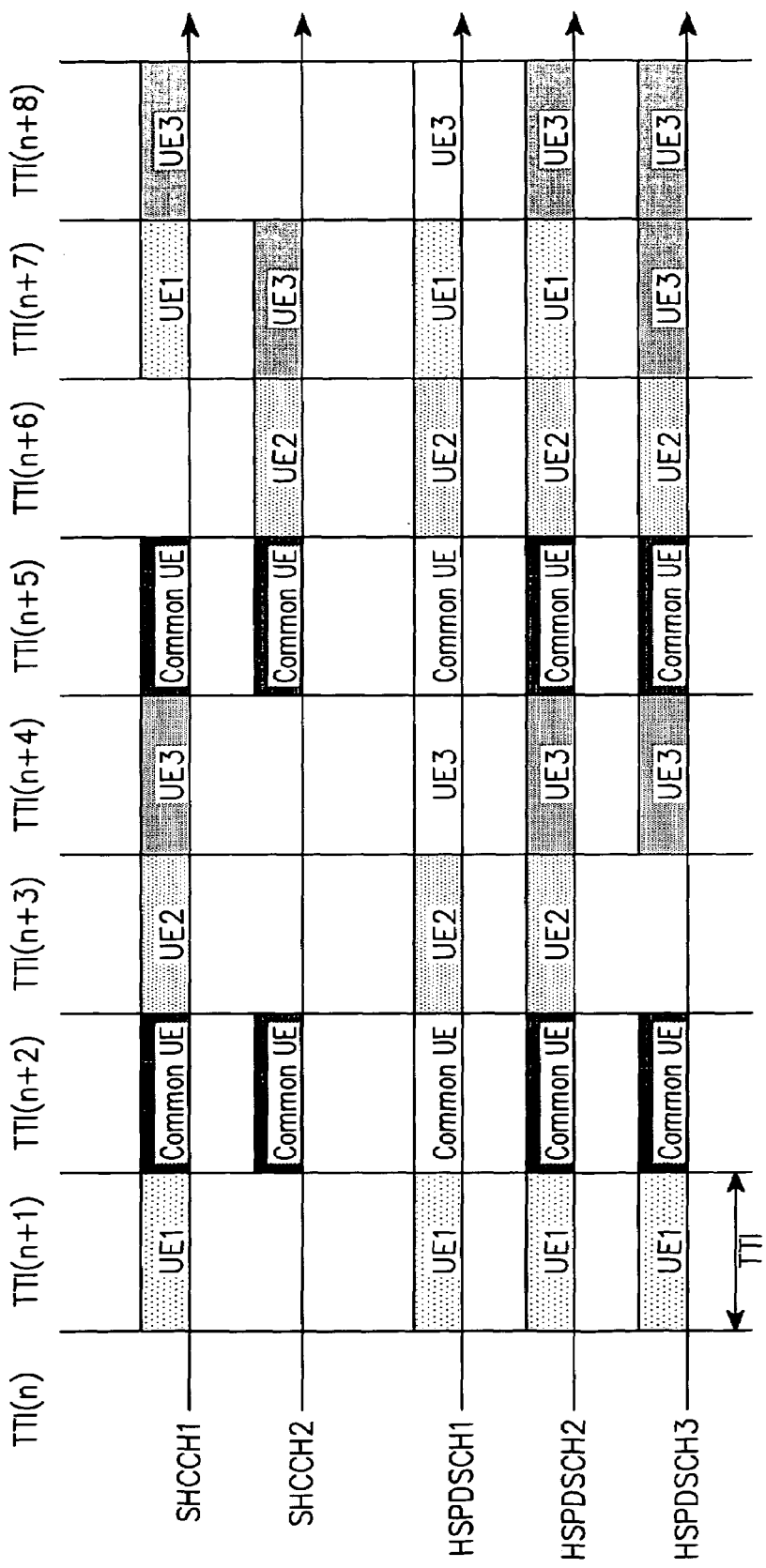
FIG. 12 illustrates a channel structure to which a 1-step method of transmitting HSDPA information is applied, in an HSDPA communication system according to an embodiment of the present invention.
Figure 13:
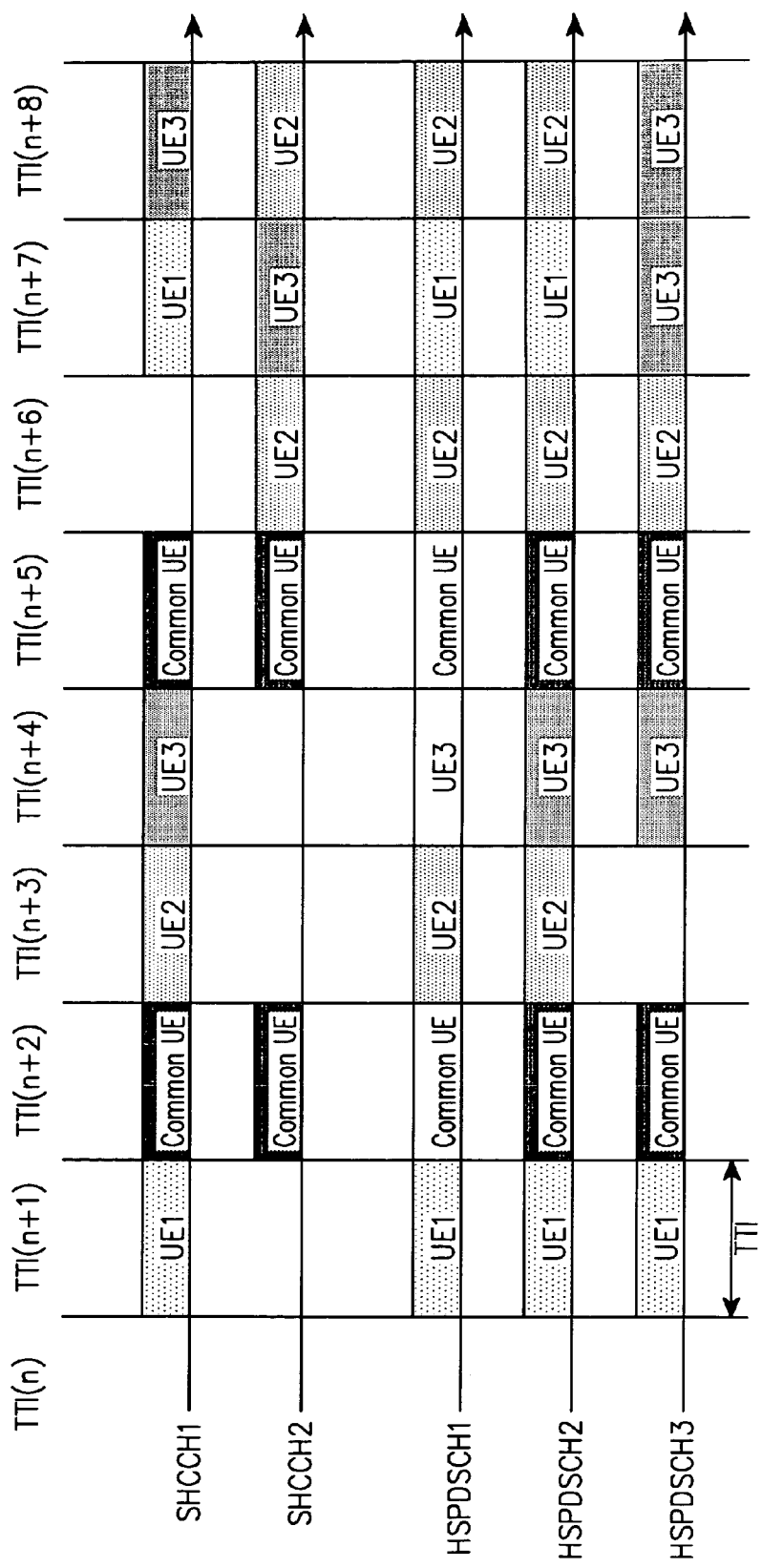
FIG. 13 illustrates a schematic channel structure to which a 1-step method of transmitting HSDPA information is applied, in an HSDPA communication system according to another embodiment of the present invention.

It is also assumed in FIGS. 12 and 13 that there are three UEs, two SHCCHs, and three HS-PDSCHs. Of course, the invention can also be applied when there are L UEs, M SHCCHs, and N HS-PDSCHs. Further, as in FIGS. 3 and 4, it will also be assumed in FIGS. 12 and 13 that a Node B determines to transmit common information to UEs in $(n+2)^{th}$ TTI and $(n+5)^{th}$ TTI.

FIG. 12 illustrates a channel structure to which a 1-step method of transmitting HSDPA information is applied in an HSDPA communication system according to an embodiment of the present invention. Referring to FIG. 12, a Node B that has determined to transmit common information in an $(n+2)^{th}$ TTI, transmits corresponding information over SHCCH in the $(n+2)^{th}$ TTI transmitting $(n+2)^{th}$ TTI HS-PDSCH information. In order to inform all UEs of transmission of the common information, the Node B uses a preset Common UE ID. If the Common UE ID information has a fixed value, all UEs can previously recognize the Common UE ID. If the Common UE ID is not a fixed value, the Node B transmits the Common UE ID to corresponding UEs along with other setup information when the UEs each initiate the HSDPA service. All the UEs that have recognized the expected receipt of the common information through the Common UE ID in the $(n+2)^{th}$ TTI, receive HS-PDSCH of the corresponding TTI after analyzing corresponding SHCCH information. If SHCCH does not include the Common UE ID, the SHCCH may include an indication that the common information will be transmitted over the HS-PDSCH. For the indication, an MCS level or certain information included in the SHCCH, i.e., HARQ information or HS-PDSCH code information, can be used.

FIG. 13 illustrates a schematic channel structure to which a I-step method of transmitting HSDPA information is applied in an HSDPA communication system according to another embodiment of the present invention. It will be assumed in FIG. 13 that some of UEs existing in the same Node B receive common information for the HSDPA service and the remaining UEs do not receive the common information. In FIG. 13, the UEs are separated into a group of UEs receiving the common information and another group of UEs not receiving the common information, and reference will be made to only the UEs receiving the common information. It will also be assumed in FIG. 13 that the three UEs are separated into a group of UE2 and UE3 receiving the common information and another group of UE1 not receiving the common information. Further, it will be assumed that the Node B has determined to transmit common information to the UEs in $(n+2)^{th}$ TTI and $(n+5)^{th}$ TTI.

Referring to FIG. 13, the Node B transmits corresponding information over an SHCCH in an $(n+2)^{th}$ TTI transmitting $(n+2)^{th}$ TTI HS-PDSCH information. In order to inform the corresponding UEs of transmission of the common information, the Node B uses a preset Common UE ID. If the Common UE ID information has a fixed value, the corresponding UEs can previously recognize the Common UE ID. If the Common UE ID is not a fixed value, the Node B transmits the Common UE ID to corresponding UEs along with other setup information when the UEs each initiate the HSDPA service.

The UE2 and the UE3 that have recognized the expected receipt of the common information through the Common UE ID in the $(n+2)^{th}$ TTI, receive HS-PDSCH of the corresponding TTI after analyzing corresponding SHCCH information. If the HI information in the $(n+1)^{th}$ TTI indicates information indicating an SHCCH that should be read in addition to information indicating a presence of the common information, the SHCCH may not include the UE ID information. In this case, the corresponding UEs are required to read a specific SHCCH, and the specific SHCCH may indicate information on an HS-PDSCH for transmitting the common information. In this case, the SHCCH may include an indication that the common information will be transmitted over the HSPDSCH. For the indication, an MCS level or certain information included in the SHCCH, i.e., HARQ information or HS-PDSCH code information, can be used. In FIG. 13, the HS-PDSCH data is transmitted to the UE2 and the UE3 even in an $(n+8)^{th}$ TTI, since the HSDPA data is transmitted to the UE2 and the UE3. In this case, the Node B transmits the UE IDs indicating the UEs instead of the Common UE ID over SHCCH of the $(n+8)^{th}$ TTI. When the UE ID is not transmitted, the indication indicating transmission of the common information is not transmitted.

Figure 14:
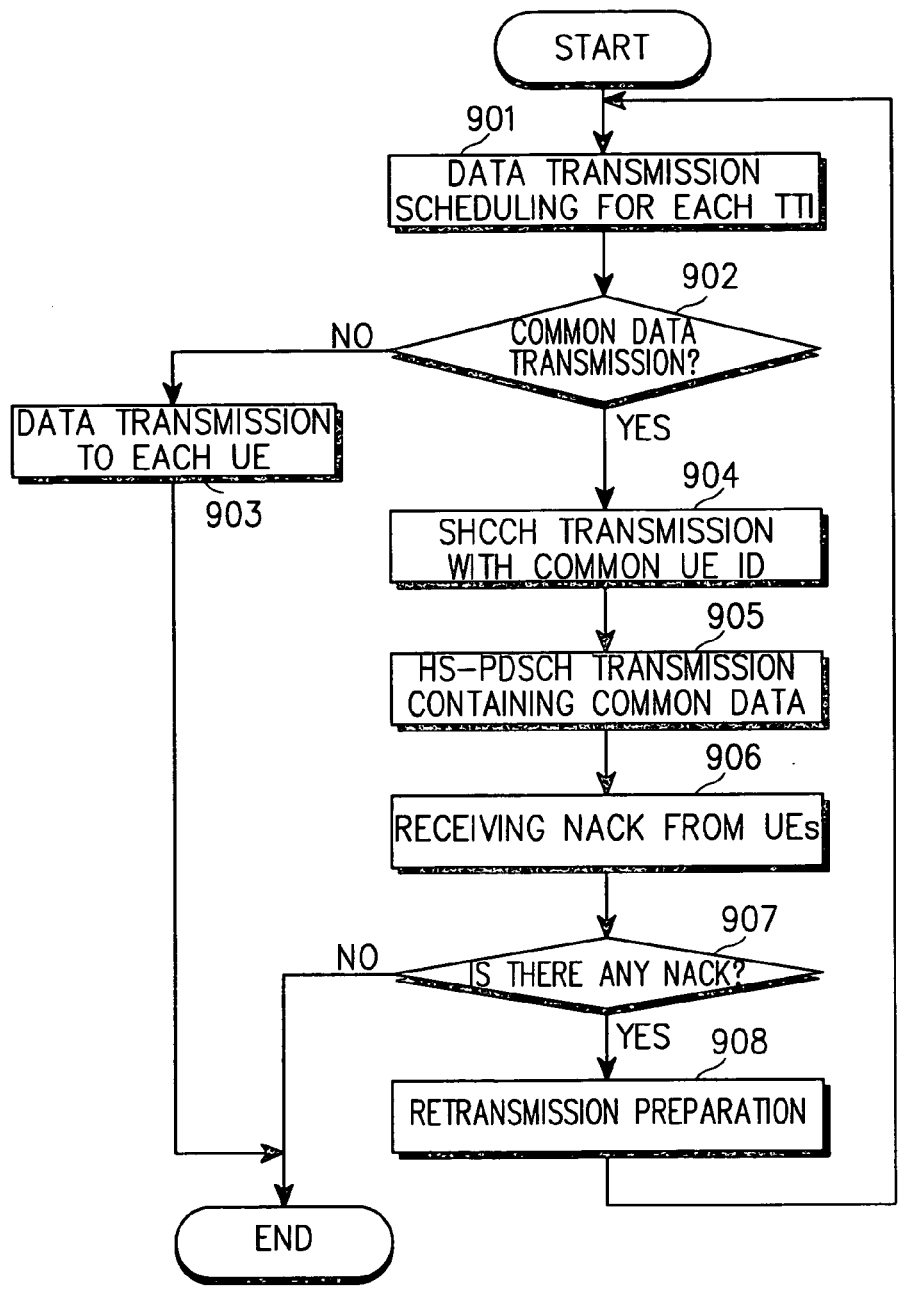
FIG. 14 illustrates a procedure for transmitting HSDPA information by a Node B using a 1-step method according to another embodiment of the present invention.

FIG. 14 illustrates a procedure for transmitting HSDPA information by a Node B using a 1-step method according to another embodiment of the present invention. Referring to FIG. 14, in step 901, the Node B performs transmission scheduling on HSDPA data for each TTI. Here, the Node B repeats transmission scheduling on the HSDPA data in each TTI, and determines transmission data and a corresponding MCS level by analyzing HSDPA data and common information data to be transmitted to each UE among the currently transmitted HSDPA data. In addition, the Node B determines a data rate considering a channel condition and data amount of each UE. When there is common information to transmit, the Node B first transmits common information related to the data rate.

In step 902, the Node B determines whether the transmission data scheduled in each TTI is common information data. If the scheduled transmission data is not common information data, the Node B proceeds to step 903, where it transmits the transmission data to a corresponding UE according to a normal HSDPA data transmission process. That is, the Node B first transmits HI to the corresponding UE, then transmits information on the corresponding UE over the SHCCH, and next transmits data to be transmitted to the corresponding UE based on the information transmitted over the SHCCH using HS-PDSCH. After transmitting the data, the Node B receives an ACK or a NACK within a preset time and ends data transmission.

However, if the scheduled transmission data is common information data in step 902, the Node B proceeds to step 904. In step 904, prior to transmission of the common information, the Node B transmits a common information indication to indicate expected transmission of common information so that all UEs can receive the common information. A Common UE ID is a typical common information indication. When transmitting common information, the SHCCH transmits Common UE ID previously known to all UEs so that the UEs can receive the common information. When the common information is transmitted to only some UEs as described in conjunction with FIG. 13, a Common UE ID known to only some UEs can be used. That is, a Common UE ID recognized by only several UEs can be previously transmitted to the UEs, using signaling information. Therefore, the UEs scheduled not to receive common information do not receive HSDPA information even though the Common UE ID recognized by only the several UEs is received. As another method, when the common information is transmitted from an upper layer, encryption information of the common information is known to only the several UEs scheduled to receive the common information, so the other UEs cannot decrypt the encrypted common information. The SHCCH may include MCS-related information, HS-PDSCH code information, and HARQ-related information in addition to the Common UE ID. In particular, if the Node B transmits common information of the HARQ information at least once and then retransmits the common information in response to NACK transmitted from the UEs, the Node B can insert the retransmission-related information in the HARQ information. That is, the Node B transmits information indicating whether the currently transmitted common information is retransmitted common information or initially transmitted common information.

Since common information of the MCS level information should be transmitted with high reliability so that all UEs can receive the common information, the MCS level is determined based on the UE having the worst channel condition. In addition, in the case of the HS-PDSCH code information, the number of codes can be adjusted according to an amount of common information. When an amount of the common information is small and the number of codes is large enough, the Node B can repeatedly transmit the common information using several codes. Alternatively, the Node B can increase transmission power using the reduced number of codes. Both the repeated transmission and the increase in transmission power contribute to reliable transmission of the common information.

In step 905, the Node B transmits the common information using HS-PDSCH in the same TTI as the SHCCH is transmitted according to an MCS level set based on the SHCCH information, and the HS-PDSCH code information. In step 906, the Node B waits for a NACK signal to be received from each UE. It is assumed in FIG. 14 that the UEs transmit the NACK only when received common information has an error. Meanwhile, if it is assumed that the UEs do not transmit the NACK, an operation of steps 906 and 907 can be omitted.

In step 907, the Node B determines whether a NACK signal is received from the UEs. If the NACK signal is not received, the Node B recognizes that transmission of the common information is successfully ended, and ends the procedure. However, if the NACK signal is received from the UEs in step 907, the Node B proceeds to step 908. In step 908, the Node B determines to repeatedly transmit the common information to the UEs that transmitted the NACK signal, prepares to retransmit the common information, and returns to step 901. Upon receipt of the NACK, the Node B may transmit the common information to either all UEs or only the UEs that transmitted the NACK.

Figure 15:
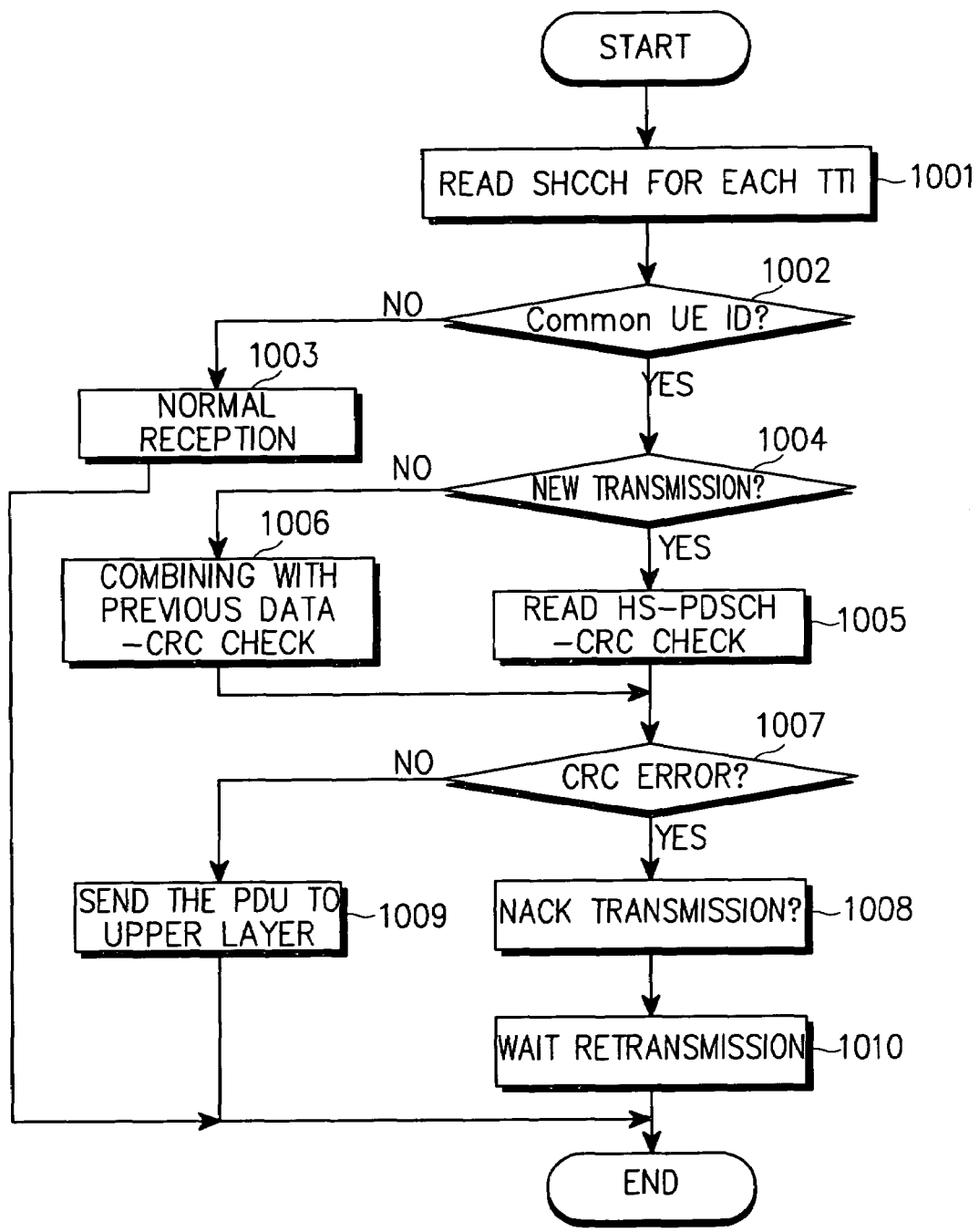
FIG. 15 illustrates a procedure for receiving HSDPA information by a UE using a 1-step method according to another embodiment of the present invention.

FIG. 15 illustrates a procedure for receiving HSDPA information by a UE using a 1-step method according to another embodiment of the present invention. Referring to FIG. 15, the UE receives SHCCH in each TTI in step 1001. The SHCCH includes an indication for distinguishing information on each UE, and a UE ID is a typical type of the indicator. It is possible to use several UE IDs as a common information indication indicating the common information among the SHCCH indications, and in this case, Common UE ID exists. In step 1002, the UE determines whether UE ID in the received SHCCH is a Common UE ID. If UE ID in the received SHCCH is not a Common UE ID, the UE proceeds to step 1003. In step 1003, the UE determines whether there is its own UE ID in addition to the Common UE ID. The UE receives HS-PDSCH when there is its own UE ID, and otherwise, the UE receives SHCCH of the next TTI. An operation of step 1003 is identical to a normal HSDPA data reception operation, so a detailed description thereof will not be provided.

If the UE ID in the received SHCCH is a Common UE ID, the UE proceeds to step 1004. In step 1004, the UE analyzes repeated transmission-related information in the SHCCH with the Common UE ID and determines whether the common information is initially transmitted common information (New Transmission). If the common information is not initially transmitted common information, i.e., the common information is retransmitted common information, the UE proceeds to step 1006. In step 1006, the UE combines the retransmission common information with the previously received defective common information, performs CRC check on the combined common data, and then goes to step 1007. There are several methods of combining the previously received common information with the retransmitted common information. A first combining method is to perform a CRC check on the retransmitted common information, combine the retransmitted common information with the previously received common information when there is an error, and then perform the CRC check again on the combined common information. A second combing method is to combine the previously received common information with the retransmitted common information in a symbol unit and then perform CRC check on the combined common information.

However, if it is determined in step 1004 that the common information is initially transmitted common information, the UE performs CRC check on the received common information in step 1005. The UE determines in step 1007 whether there is a CRC error. If there is no CRC error, the UE transmits the received common information to an upper layer to analyze the common information in step 1009. However, if there is a CRC error in step 1007, the UE transmits NACK in order to inform the Node B that the received common information has an error, in step 1008. The operation of step 1008 is needed only when the UE transmits NACK. If the UE does not transmit NACK even though the received common information has an error, the operation of step 1008 can be omitted. In step 1010, the UE waits for the common information to be retransmitted from the Node B.

As described above, in the HSDPA communication system according to the present invention, a Node B simultaneously transmits common information to all UEs supporting the HSDPA service, thus increasing efficiency of the HSDPA service. In addition, after transmitting the common information to all the UEs, the Node B selectively receives responses from the UEs, contributing to a decrease in a system load. Further, the Node B transmits the common information by repeated transmission or at increased transmission power, thereby increasing transmission reliability of the common information.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting common information to at least two UEs (User Equipments) among a plurality of UEs supporting a high-speed downlink packet access (HSDPA) service in a CDMA (Code Division Multiple Access) communication system supporting an HSDPA service, comprising the steps of:

transmitting a common indicator in a transmission period to at least two UEs through a dedicated channel related with the at least two UEs indicating that data to be received exists;

transmitting common control information in a transmission period through a shared control channel, wherein the common control information includes a common ID (Identification) indicating common information to the UEs is transmitted through packet data channel; and transmitting the common information through the packet data channel, wherein the common information is transmitted at a transmission power greater than a transmission power used to transmit information other than the common information.

2. The method of claim 1, wherein the common information is repeatedly transmitted a predetermined number of times.

3. The method of claim 1, further comprising:

after transmitting the common information, retransmitting the common information to at least one specified UE, upon receiving a NACK(Negative Acknowledgement) signal from the at least one specified UE among all UEs that received the common information.

4. The method of claim 1, further comprising:

after transmitting the common information, retransmitting the common information to all UEs upon receiving a NACK signal from specified UEs among all UEs that received the common information.

5. The method of claim 3, further comprising:
before retransmitting the common information, transmitting at least one indicator only to each of the at least one specified UE through a shared control channel related to the at least one specified UE indicating that data to be received exists.

6. A method of transmitting common information to at least two UEs (User Equipments) among a plurality of UEs supporting a High-Speed Downlink Packet Access (HSDPA) service in a Code Division Multiple Access (CDMA) communication system supporting an HSDPA service, comprising the steps of:
transmitting a common indicator in a transmission period to at least two UEs through a dedicated channel related with the at least two UEs indicating that data to be received exists;
transmitting common control information in a transmission period through a shared control channel, wherein the common control information comprises a common IDentification (ID) indicating common information to the UEs is transmitted through a packet data channel; and
transmitting the common information through the packet data channel.

7. A method of transmitting common information to at least two UEs (User Equipments) among a plurality of UEs supporting a high-speed downlink packet access (HSDPA) service in a CDMA (Code Division Multiple Access) communication system supporting an HSDPA service, comprising the steps of:
transmitting a common indicator in a transmission period to at least two UEs through a dedicated channel related to the at least two UEs indicating that data to be received exists;
determining by a Node B UEs to receive common information;
generating by the Node B common control information identifying the UEs to receive the common information and indicating when the common information will be transmitted, and to inform the UEs to receive the common information of the transmission of said information;
transmitting by the Node B to all UEs the common control information in a transmission period through a shared control channel, wherein the common control information includes a common ID (IDentification) indicating that the common information to the UEs is transmitted through an identified packet data channel, said common ID identifying more than one UE; and
transmitting the common information through the packet data channel,
wherein the common information is transmitted at a transmission power greater than a transmission power used to transmit information other than the common information.

8. A method of transmitting common information to at least two UEs (User Equipments) among a plurality of UEs supporting a High-Speed Downlink Packet Access (HSDPA) service in a Code Division Multiple Access (CDMA) communication system supporting an HSDPA service, comprising the steps of:
transmitting a common indicator in a transmission period to at least two UEs through a dedicated channel related to the at least two UEs indicating that data to be received exists;
determining by a Node B UEs to receive common information;
generating by the Node B common control information identifying the UEs to receive the common information and indicating when the common information will be transmitted, and to inform the UEs to receive the common information of the transmission of said information;
transmitting by the Node B to all UEs the common control information in a transmission period through a shared control channel, wherein the common control information comprises a common IDentification (ID) indicating that the common information to the UEs is transmitted through an identified packet data channel, said common ID identifying more than one UE; and
transmitting the common information through the packet data channel.

* * * * *

UNITED STATES PATENT AND TRADEMARK OFFICE
CERTIFICATE OF CORRECTION

PATENT NO. : 7,633,899 B2  Page 1 of 1
APPLICATION NO. : 10/218311
DATED : December 15, 2009
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2219 days.

Signed and Sealed this

Ninth Day of November, 2010

David J. Kappos
*Director of the United States Patent and Trademark Office*